US010683911B2

(12) United States Patent
 Praca

(10) Patent No.: US 10,683,911 B2
(45) Date of Patent: Jun. 16, 2020

(54) DUAL FUNCTION GEARBOX, GEARBOX SYSTEM AND METHOD

(71) Applicant: Sundrive Technologies, LLC, Danville, CA (US)

(72) Inventor: Miguel Praca, Kentfield, CA (US)

( * ) Notice: Subject to any disclaimer, the term of this patent is extended or adjusted under 35 U.S.C. 154(b) by 170 days.

(21) Appl. No.: 15/758,632

(22) PCT Filed: May 31, 2017

(86) PCT No.: PCT/US2017/035153
 § 371 (c)(1),
 (2) Date: Mar. 8, 2018

(87) PCT Pub. No.: WO2017/210265
 PCT Pub. Date: Dec. 7, 2017

(65) Prior Publication Data
 US 2018/0245668 A1    Aug. 30, 2018

Related U.S. Application Data

(60) Provisional application No. 62/392,438, filed on Jun. 1, 2016.

(51) Int. Cl.
 *F16H 1/32* (2006.01)
 *F16H 57/02* (2012.01)
 (Continued)

(52) U.S. Cl.
 CPC .............. *F16H 1/32* (2013.01); *F16H 57/02* (2013.01); *F16D 1/0894* (2013.01); *F16H 2001/324* (2013.01); *F24S 2030/134* (2018.05)

(58) Field of Classification Search
 CPC .................... F16H 2001/324; F16H 2030/134
 See application file for complete search history.

(56) References Cited

U.S. PATENT DOCUMENTS 1,192,627 A * 7/1916 Hatlee ...................... F16H 1/32
 475/176
4,023,441 A   5/1977 Osterwalder
 (Continued)

FOREIGN PATENT DOCUMENTS

FR           849434 A  * 11/1939  ............... F16H 1/32
FR           976810 A  *  3/1951  ............... B66D 3/16

*Primary Examiner* — Sherry L Estremsky
(74) *Attorney, Agent, or Firm* — Jay P. Hendrickson

(57) ABSTRACT

A dual function gearbox generates two separate output rotational motions from a single input rotational motion. First and second rotatable housings comprise corresponding first and second internal gears, with the internal gears having different pitch diameters. A drive shaft is disposed within the housings, extending though openings within opposite sides of housings, with an eccentric rotor disposed around the drive shaft. The eccentric rotor is in operative contact with a differential gear ring comprising first and second external gear rings having different diameters, with the first and second external gear rings engaging corresponding first and second internal gears. When rotational energy is imparted to one end of the drive shaft, the gearing arrangement imparts a rotational motion to either the first or second rotatable housing, with the housing rotating around the other end of the rotating drive shaft, which can extend outside of the dual function gearbox. Thus, the dual function gearbox generates two output motions: high torque rotation of the rotatable housing; and rotation of the drive shaft which can be used as an input rotation to additional dual function gearboxes.

30 Claims, 17 Drawing Sheets

(51) Int. Cl.
   *F16D 1/08* (2006.01)
   *F24S 30/00* (2018.01)

(56) References Cited

U.S. PATENT DOCUMENTS

| | | | |
|---|---|---|---|
| 4,574,659 A | 3/1986 | Arndt | |
| 5,145,468 A | 9/1992 | Nagabbusan | |
| 7,819,770 B2 | 10/2010 | Haga | |
| 2017/0353146 A1* | 12/2017 | Praca | H02S 20/32 |

* cited by examiner

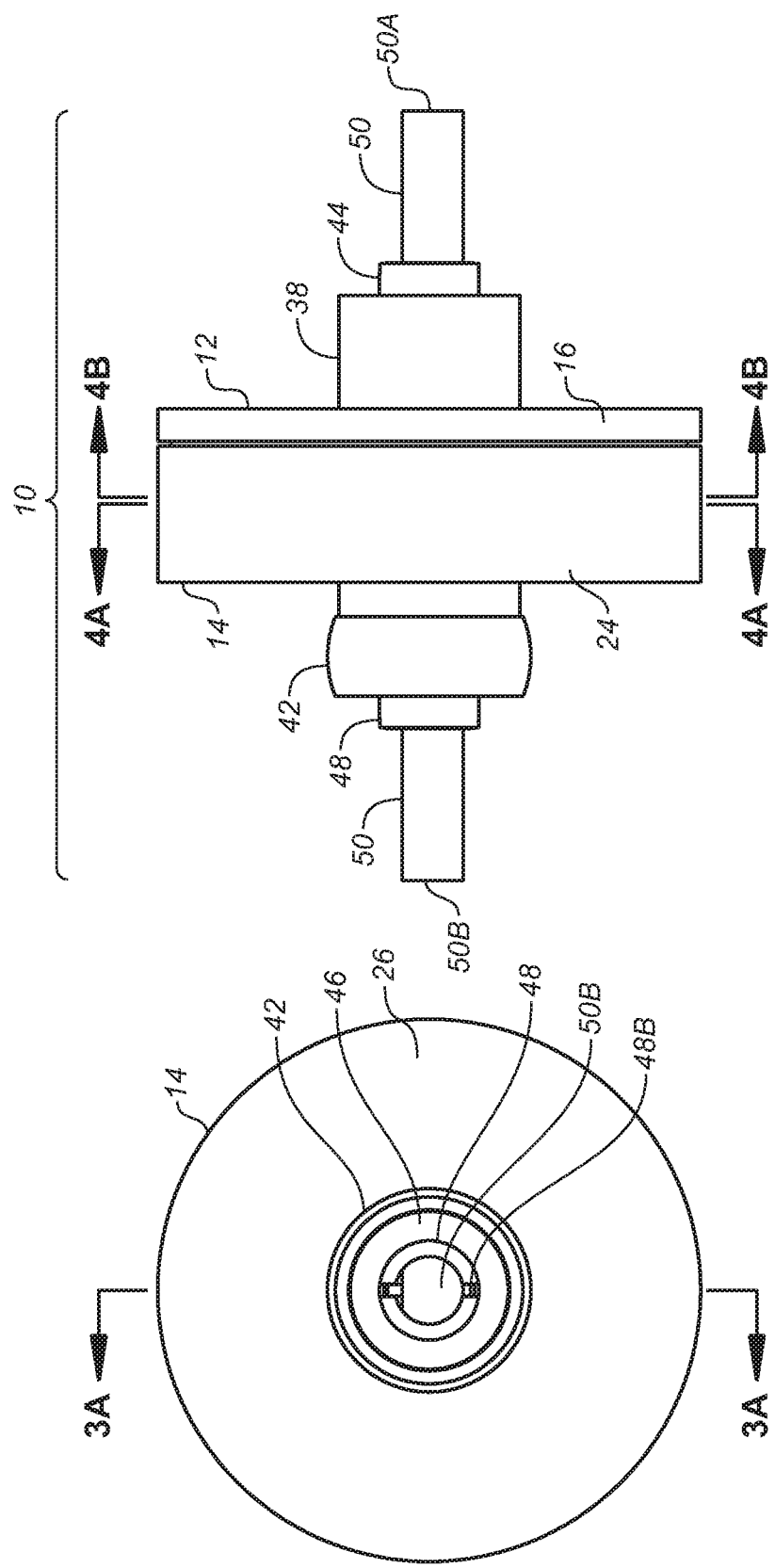

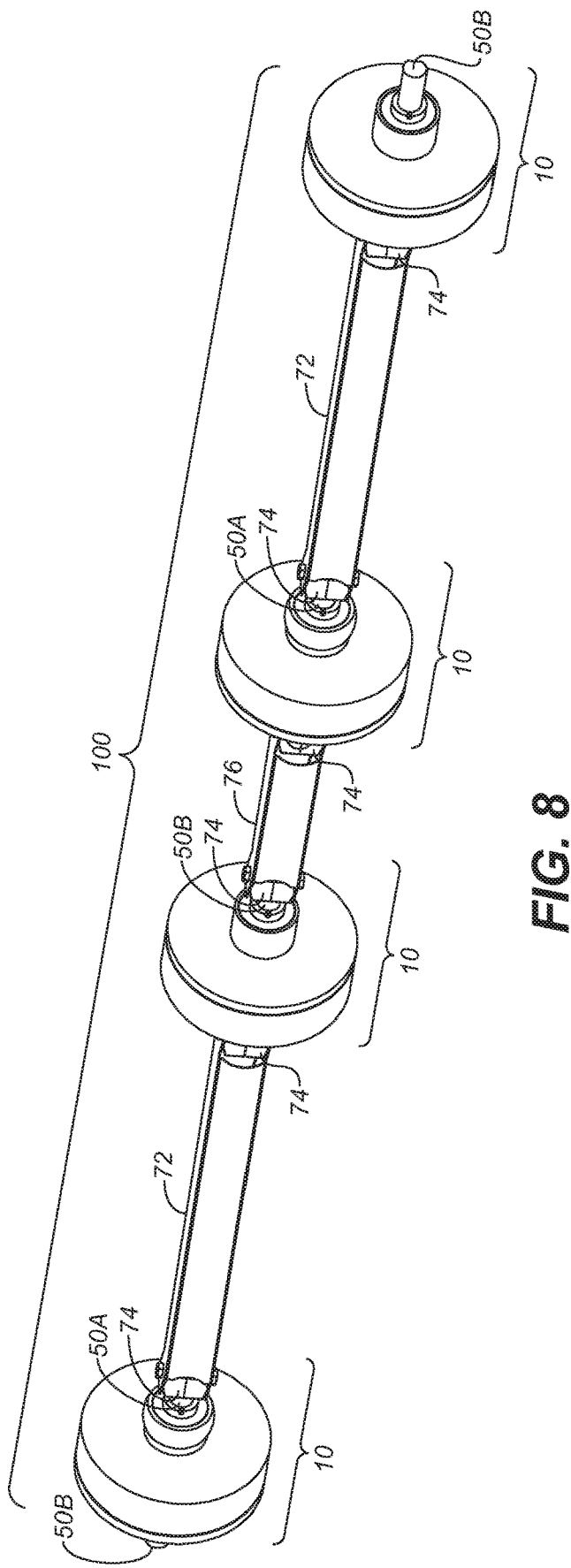

DUAL FUNCTION GEARBOX, GEARBOX SYSTEM AND METHOD

RELATED APPLICATIONS

This application is a U.S. Nonprovisional application and claims the benefit under 35 US.C § 119(e) of U.S. Provisional Application 62/392,438.

TECHNICAL FIELD

This application relates to gearboxes, gearbox systems and methods of using gearboxes in the field of mechanical power transmission.

BACKGROUND

Gearing assemblies utilizing different types of gearing methods for many different applications are well known in the art. Some applications describe gearing devices that convert in a single stage an input rotation of a shaft, having a relatively high angular velocity and low torque, to an output rotation of another part of the assembly, having a comparatively low angular velocity and high torque. An example of this type of single stage gearing assembly is presented in U.S. Pat. No. 3,955,445 issued Jean-Pierre Osterwalder (hereinafter the "Osterwalder" patent).

The Osterwalder patent describes and illustrates a speed reducing system that can generate a large angular velocity reduction and torque multiplication in a single stage. The system includes an "input shaft" and a separate "output shaft" that is not integral with the input shaft, with the input shaft operatively connected to a gear component having a primary and secondary gear which rotate as a single gear. The primary gear engages a fixed gear spline, while the secondary gear engages a rotatable output gear spline. The Osterwalder patent states that this combination of gears, together with an eccentric and counterweight integral with the input shaft, provides a system with numerous advantages in the field of high-ratio mechanical power transmission. More specifically, the patent describes that in order to "achieve a dynamically balance system" an eccentric, utilized to create an eccentric rotational motion of the primary and secondary gears, is "formed integrally with a "counterweight" that functions to balance the system. The Osterwalder patent also describes a nonrotatable input gear spline and a rotatable output gear spline, with the rotatable output gear spline integral with an output shaft, also referred to as an "output transmitting member", and with the peripheral, outside diameter of the output transmitting member journaled for rotation by a relatively large diameter bearing assembly with an outer casing forming part of the external structure of the system. In this regard, it is again noted that the output shaft, also referred to as the output transmitting member, is not integral with or part of the input shaft. In operation, the rotating input shaft imparts an eccentric rotation to the primary and secondary gears, with the engagement of the secondary gear with the rotatable output gear spline causing the output transmitting member to rotate at a high torque much higher than the torque of the input shaft. In this regard, although not expressly discussed in the Osterwalder patent, it is pointed out that the large diameter bearing assembly might also contribute to dynamic instability of the system, necessitating the use of the counterweight. Another significant limitation of the gearing assembly disclosed by the Osterwalder patent is that the assembly can only generate the single function of imparting a rotational motion to the output transmitting member. It is a feature of the dual function gearbox disclosed herein that the gearbox overcomes the limitations of the system disclosed in the Osterwalder patent.

There are several applications for using a single gearbox that can generate as an output a high torque that can be used to rotate a long row of devices. One example would be a conventional solar tracker that rotates a long array of solar panels in order for the panels to follow the apparent path of the sun, thereby maximizing the amount of sunlight that is absorbed by the solar panels. In this regard, the conventional method normally uses a single motor and associated gearbox to rotate a long torque tube that rotates the solar panel row. Depending on the number of solar panels in the row, the motor may need to generate an extremely high torque in order to impart sufficient torque to the torque tube to successfully overcome the torque generated by wind loads on the solar panels. In this regard, since a single motor is normally used for a row, or maybe used for multiple rows, the torques tubes need to be long, in some cases up to 300 feet or more. And, long torque tubes will develop large torsional deflections and are vulnerable to premature failure due to the torsional loads, low frequency vibration due to torsional loads, and thermal expansion axially through the torque tubes. Another application that utilizes similar technology are greenhouses that need to open and close rows of glass windows, not necessarily in linear alignment, in order to regulate the temperate in the greenhouse.

An object of the present dual function gearbox, gearbox system and method is to provide a new and improved gearbox that generates dual rotational output motions from a single gearbox or from a system of gearboxes to control solar panels, greenhouse windows and other similar applications.

SUMMARY

A dual function gearbox is described herein which comprises: a gearbox housing enclosure which comprises a first rotatable housing having a cylindrical sidewall, with the cylindrical sidewall having a closed end and an open end opposite from the closed end, and with a housing opening within the closed end of the first rotatable housing; and a second rotatable housing having a cylindrical sidewall, with the cylindrical sidewall having a closed end and an open end opposite from the closed end, with a housing opening within the closed end of the second rotatable housing, and with the open end of the cylindrical sidewall of the second rotatable housing adjacent to the open end of the cylindrical sidewall of the first rotatable housing. The dual function gearbox further comprises: a 1) a first internal gear integral with the cylindrical sidewall of the first rotatable housing, with the first internal gear having a pitch diameter D1; 2) a second internal gear integral with the cylindrical sidewall of the second rotatable housing, with the second internal gear having a pitch diameter D2 that is larger or smaller than pitch diameter D1; 3) a first external gear ring and a second external gear ring that are concentrically connected so as to form an integral differential gear ring disposed within the gearbox housing enclosure, with the integral differential gear ring having a concentric opening within the integral differential gear ring, with the first external gear ring having a pitch diameter D3 that is less than the pitch diameter D1 of the first internal gear, and with the second external gear ring having a pitch diameter D4 that is less than the pitch diameter D2 of the second internal gear, with the first external gear ring in partial engagement with the first internal gear and with the second external gear ring in partial engagement with the second internal gear; and 4) a drive shaft disposed within the gearbox housing enclosure, with the drive shaft having an integral single rotor eccentrically disposed around the drive shaft, with a first connecting end, integral with the drive shaft, disposed through the housing opening within the first rotatable housing, with a second connecting end, integral with the drive shaft, disposed through the housing opening within the second rotatable housing, and with the integral single rotor disposed within the opening within the integral differential gear ring. In operation, rotational energy imparts a rotational motion to the drive shaft, which in turn imparts an eccentric rotation to the integral single rotor around the rotating drive shaft, which in turn imparts an eccentric rotation to the first external gear and to the second external gear, with the first external gear eccentrically rotating in engagement with the first internal gear and with the second external gear eccentrically rotating in engagement with the second internal gear, and which in turn imparts a rotation to one of the rotatable housings which rotates around the rotating drive shaft, and with the rotating rotatable housing having an angular velocity that is less than the angular velocity of the drive shaft and having a torque that is greater than the torque of the drive shaft.

A gearbox system is also described herein, which comprises: a pair of dual function gearboxes, with each dual function gearbox out of the pair of dual function gearboxes, comprising: a gearbox housing enclosure which comprises a first rotatable housing having a cylindrical sidewall, with the cylindrical sidewall having a closed end and an open end opposite from the closed end, and with a housing opening within the closed end of the first rotatable housing; and a second rotatable housing having a cylindrical sidewall, with the cylindrical sidewall having a closed end and an open end opposite from the closed end, with a housing opening within the closed end of the second rotatable housing, and with the open end of the cylindrical sidewall of the second rotatable housing adjacent to the open end of the cylindrical sidewall of the first rotatable housing. Each dual function gearbox out of the pair of dual function gearboxes further comprises: 1) a first internal gear integral with the cylindrical sidewall of the first rotatable housing, with the first internal gear having a pitch diameter D1; 2) a second internal gear integral with the cylindrical sidewall of the second rotatable housing, with the second internal gear having a pitch diameter D2 that is larger or smaller than pitch diameter D1; 3) a first external gear ring and a second external gear ring that are concentrically connected so as to form an integral differential gear ring disposed within the gearbox housing enclosure, with integral differential gear ring having a concentric opening within the integral differential gear ring, with the first external gear ring having a pitch diameter D3 that is less than the pitch diameter D1 of the first internal gear and with the second external gear ring having a pitch diameter D4 that is less than the pitch diameter D2 of the second internal gear, with the first external gear ring in partial engagement with the first internal gear and with the second external gear ring in partial engagement with the second internal gear; and 4) a drive shaft disposed within the gearbox housing enclosure, with the drive shaft having an integral single rotor eccentrically disposed around the drive shaft, with a first connecting end, integral with the drive shaft, disposed through the housing opening within the first rotatable housing, with a second connecting end, integral with the drive shaft, disposed through the housing opening within the second rotatable housing, and with the integral single rotor disposed within the opening within the integral differential gear ring. The gearbox system further comprises an internal rotatable member in rotatable connection at one end to a second connecting end of a drive shaft of a gearbox out of the first pair of gearboxes, and with the internal rotatable member in rotatable connection at an opposite end to a second connecting end of a drive shaft of the other gearbox out of the first pair of gearboxes. In operation, whereby, as to each gearbox out of the first pair of gearboxes, rotational energy imparts a rotational motion to the drive shaft, which in turn imparts an eccentric rotation to the integral single rotor around the rotating drive shaft, which in turn imparts an eccentric rotation to the first external gear and to the second external gear, with the first external gear eccentrically rotating in engagement with the first internal gear and with the second external gear eccentrically rotating in engagement with the second internal gear, and which in turn imparts a rotation to one of the rotatable housings which rotates around the rotating drive shaft, and with the rotating rotatable housing having an angular velocity that is less than the angular velocity of the drive shaft and having a torque that is greater than the torque of the drive shaft.

The gearbox system further comprises a second pair of gearboxes, with each gearbox out of the second pair of gearboxes having the structure of each gearbox out of the first pair of gearboxes, with a first connecting end of the drive shaft of a gearbox out of the second pair of gearboxes rotatably connected to a first connecting end of the drive shaft of a gearbox out of the first pair of gearboxes, thereby connecting the first and second pairs of gearboxes.

A gearing method is further described herein which comprises:

(a) rotatably and coaxially connecting a drive shaft for a gearbox out of a pair of gearboxes to a drive shaft for the other gearbox out of the pair of gearboxes;
(b) rotating the coaxially connected drive shafts;
(c) eccentrically rotating rotors integral with corresponding rotating drive shafts;
(d) engaging the eccentrically rotating rotors with corresponding first external gears and second external gears for corresponding gearboxes out of the pair of gearboxes, causing the first and second external gears for each gearbox out of the pair of gearboxes to rotate eccentrically;
(e) engaging the eccentrically rotating first external gears and second external gears for corresponding gearboxes out of the pair of gearboxes with corresponding first internal gears and second internal gears for corresponding gearboxes out of the pair of gearboxes; and
(f) preventing the first internal gears for corresponding gearboxes out of the pair of gearboxes from rotating, thereby causing the second internal gears for corresponding gearboxes out of the pair of gearboxes to rotate around corresponding rotating drive shafts.

BRIEF DESCRIPTION OF DRAWINGS

FIG. 8 illustrates the gearbox system with two pairs of dual function gearboxes, with each pair of dual function gearboxes connected by an internal rotatable member, and with the two pairs of dual function gearboxes connected by an external rotatable member.

DETAILED DESCRIPTION

Figure 1A:
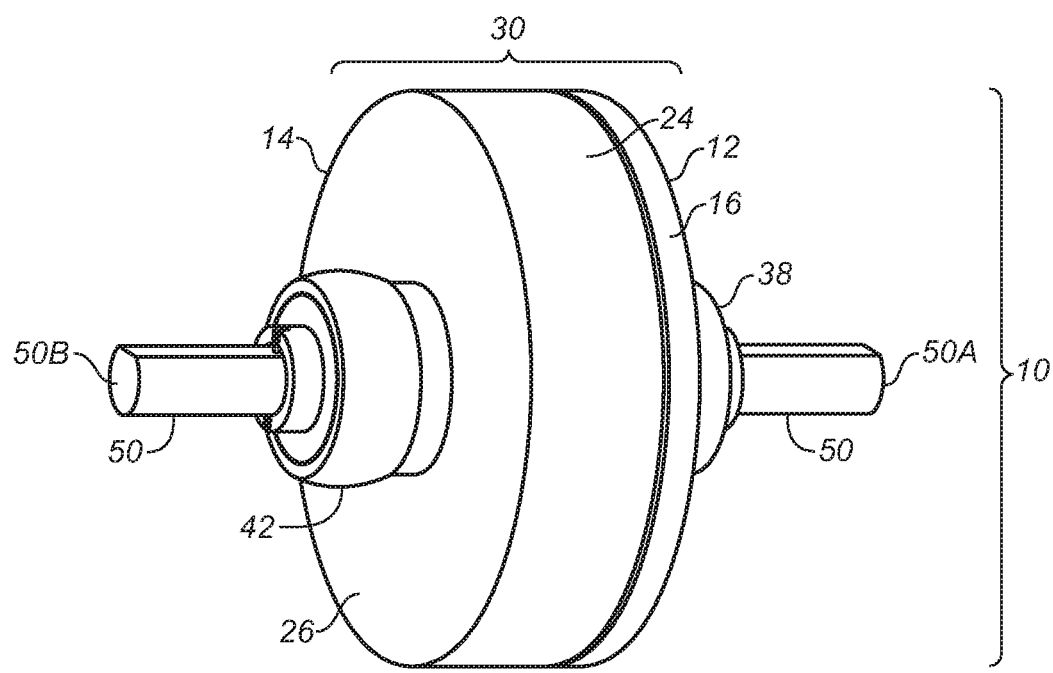
FIG. 1A, FIG. 1B and FIG. 1C illustrate perspective views of a dual function gearbox, with FIG. 1 C adding a graphical representation of a driver connected to the dual function gearbox for supplying rotational energy to the dual function gearbox.
Figure 1B:
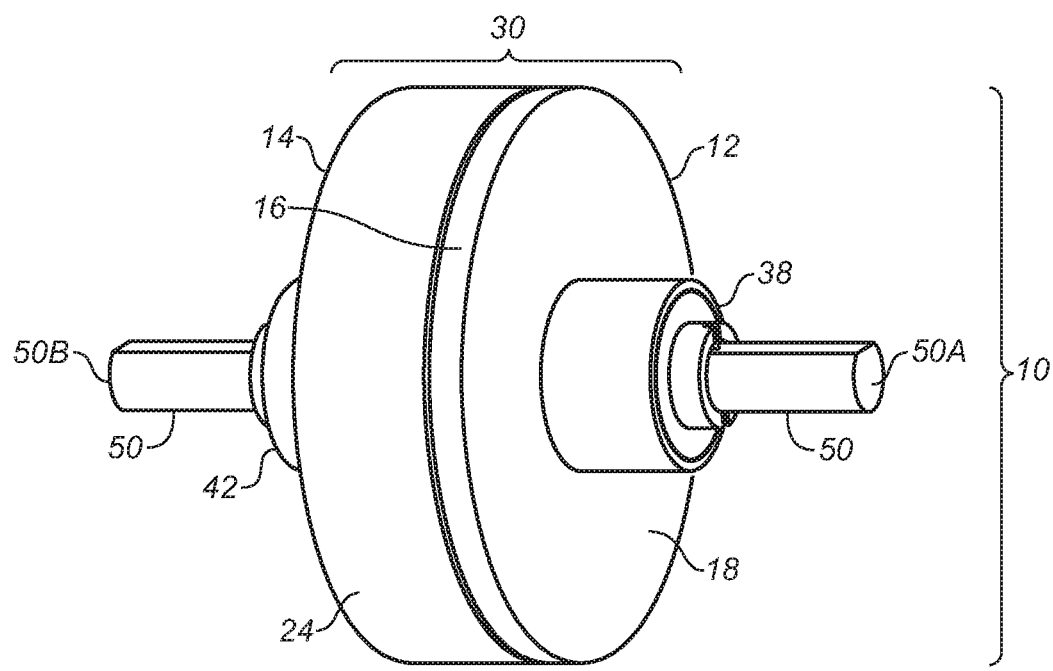

A dual function gearbox 10 is generally illustrated in FIG. 1A through FIG. 4B. The dual function gearbox 10 comprises an input rotatable housing 12 and an output rotatable housing 14. The input rotatable housing 12 has a cylindrical sidewall 16 having a closed end 18 and an open end 20 opposite from the closed end 18. And, the output rotatable housing 14 has a cylindrical sidewall 24 having a closed end 26 and an open end 28 opposite from the closed end 26, with the open end 20 of cylindrical sidewall 16 adjacent to the open end 28 of cylindrical sidewall 24, thereby forming a gearbox housing enclosure 30 having a cylindrical shape. The input rotatable housing 12 also has a cylindrical opening 34 within the closed end 18 of cylindrical sidewall 16 of the input rotatable housing 12, and the output rotatable housing 14 also has a cylindrical opening 36 within the closed end 26 of cylindrical sidewall 24 of the output rotatable housing 14, which is opposite from the cylindrical opening 34. In a preferred embodiment, the open end 20 of cylindrical sidewall 16 of input rotatable housing 12 is concentrically disposed within the open end 28 of the cylindrical sidewall 24 of the output rotatable housing 14, such that the cylindrical sidewall 24 partially overlaps the cylindrical sidewall 16, thereby creating partially overlapping cylindrical sidewalls. An O-ring 32, or any other similar sealing member, can be concentrically positioned between the partially overlapping cylindrical sidewalls and disposed within a concentric groove 32A in an outside perimeter of the cylindrical sidewall 16. In this manner, the O-ring 32 creates a rotatable seal between the cylindrical sidewall 16 of input rotatable housing 12 and the cylindrical sidewall 24 output rotatable housing 14.

The dual function gearbox 10, sometimes referred to herein as gearbox 10, also comprises an input bearing housing enclosure 38 and an output bearing housing enclosure 42, with the input and output bearing housing enclosures, 38 and 42, integral with the gearbox housing enclosure 30. The input bearing housing enclosure 38 has a cylindrical shape with an open end 38A and an opposite open end 38B, with open end 38A concentrically integral with the cylindrical opening 34 of the input rotatable housing 12. A rotatable securing ring 40 is disposed within the open end 38B of input bearing housing enclosure 38, with the rotatable securing ring 40 having an integral securing ring extension 44 that is not disposed within the open end of 38B of input bearing housing enclosure 38. Preferably, an O-ring 40A, or any other similar sealing member, can be positioned around the rotatable securing ring 40 and disposed within a concentric groove 40B around an outside perimeter of rotatable securing ring 40. And, an elongate securing pin 44A can be inserted within a radial bore opening 44B that extends through the integral securing ring extension 44. Similarly, the output bearing housing enclosure 42 has a cylindrical shape with an open end 42A and an opposite open end 42B, with open end 42A concentrically integral with the cylindrical opening 36 of the output rotatable housing 14. A rotatable securing ring 46 is disposed within the open end 42B of output bearing housing enclosure 42, with the rotatable securing ring 46 having an integral securing ring extension 48 that is not disposed within the open end of 42B of output bearing housing enclosure 42. Preferably, an O-ring 46A, or any other similar member, is positioned around the rotatable securing ring 46 and disposed within a concentric groove 46B around an outside perimeter of rotatable securing ring 46. And, an elongate securing pin 48A can be inserted within a radial bore opening 48B that extends through the integral securing ring extension 48. As will be discussed in more detail below, the dual function gearbox 10 also comprises a drive shaft 50 that can be secured within the gearbox 10 by utilizing the integral securing ring extensions, 44 and 48, and corresponding elongate securing pins 44A and 48A.

Figure 4B:
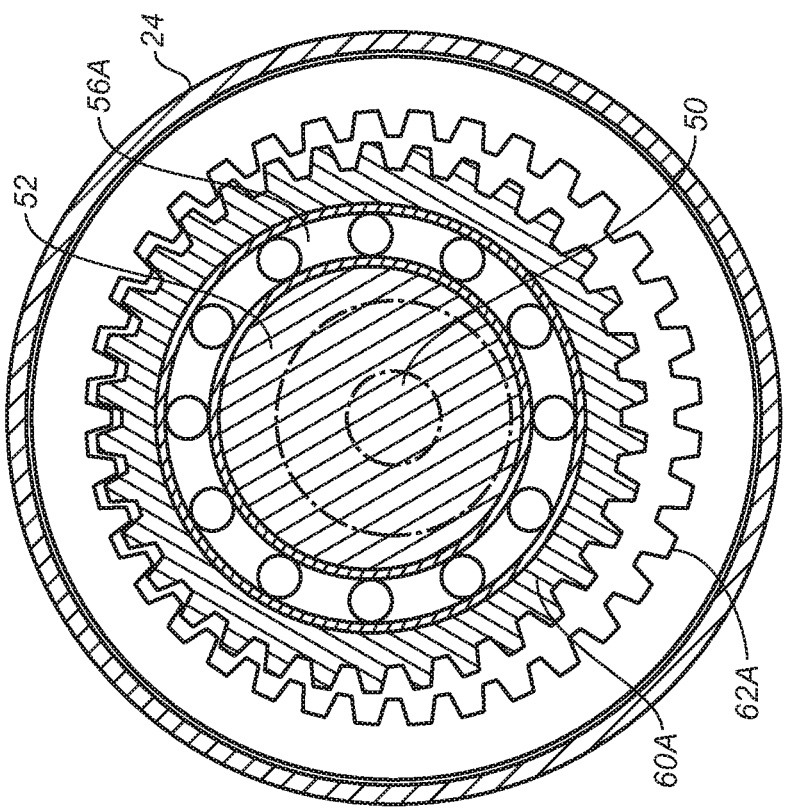
FIG. 4 illustrates a side view of the dual function gearbox with cross-sectional lines 4A-4A and 4B-4B, with FIG. 4A and FIG. 4B illustrating cross-sectional views of the dual function gearbox as viewed in the directions indicated by cross-sectional lines 4A-4A and 4B-4B, respectively.
Figure 4A:
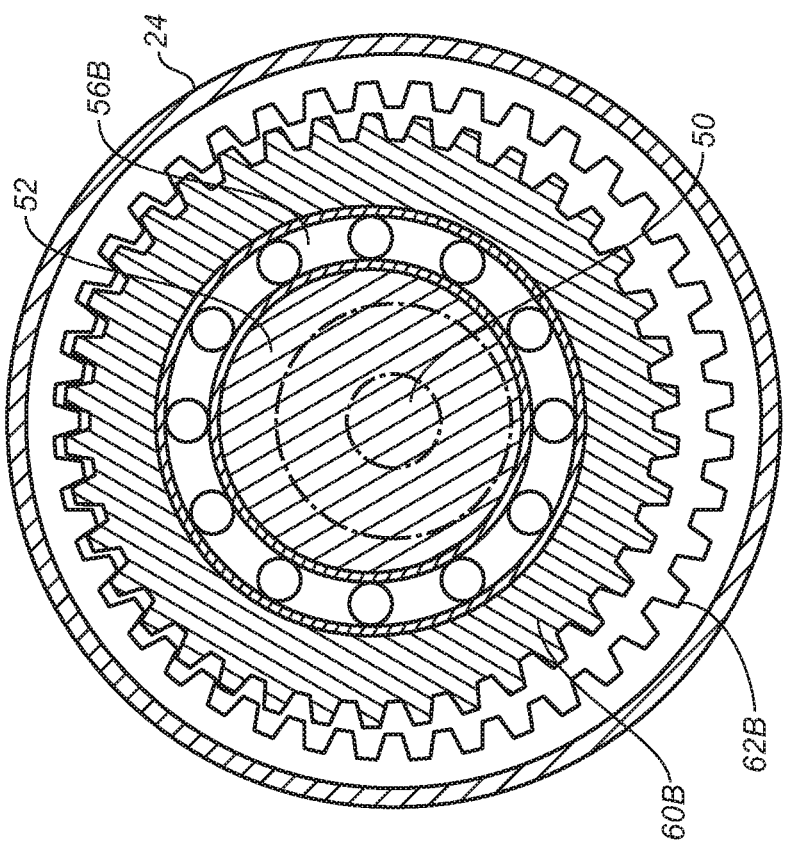

A first internal gear 62A is disposed within the gearbox housing enclosure 30 and is integral with the cylindrical sidewall 16, with the first internal gear 62A having a pitch diameter D1. A second internal gear 62B is similarly disposed within the gearbox housing enclosure 30 and is integral with the cylindrical sidewall 24, with the second internal gear 62B having a pitch diameter D2, which can be either larger or smaller than the pitch diameter D1 of the first internal gear 62A. As an example, the figures illustrate that the first internal gear 62A has a pitch diameter that is less than the pitch diameter of internal gear 62B. A first external gear ring 60A and a second external gear ring 60B are concentrically connected so as to form an integral differential gear ring 60 that is disposed within the gearbox housing enclosure 30, with the integral differential gear ring 60 having a concentric opening 64 through the integral differential gear ring 60. The first external gear ring 60A has a pitch diameter D3 that is less than the pitch diameter D1 of the first internal gear 62A, and the second external gear ring 60B has a pitch diameter D4 that is less than the pitch diameter D2 of the second internal gear 62B, with the first external gear ring 60A in partial engagement with the first internal gear 62A as shown in FIG. 4AB, and with the second external gear ring 60B in partial engagement with the second internal gear 62B as shown in FIG. 4A. Preferably, the first external ring 60A and second external gear ring 60B, forming the integral differential gear ring 60, each have spur gears with teeth having an involute profile and a pressure angle of lower than about 25 degrees.

The drive shaft 50, having an input connecting end 50A, an output connecting end 50B and a diameter D, is disposed within the dual function gearbox 10. Specifically, the drive shaft 50 is disposed and secured within the gearbox housing enclosure 30 and the following components integral with the gearbox housing enclosure 30: the input bearing housing enclosure 38, the rotatable securing ring 40 and corresponding integral securing ring extension 44; and the output bearing housing enclosure 42, the rotatable securing ring 46 and corresponding integral securing ring extension 48. And, in a preferred embodiment, input connecting ends, 50A and 50B, of drive shaft 50 extend a predetermined distance outside of the corresponding integral securing ring extensions 44 and 48 and, thus, extend outside of the dual function gearbox 10. The drive shaft 50 is preferably secured within the gearbox housing enclosure of gearbox 10 by utilizing the integral securing ring extensions, 44 and 48, and corresponding elongate securing pins, 44A and 48A. The elongate securing pins, 44A and 48A, can be inserted through corresponding radial bore openings, 44B and 48B, within corresponding integral securing ring extensions, 44 and 48, with the elongate securing pins, 44A and 48B also inserted through corresponding radial bore openings, 50C and 50D, within the drive shaft 50.

Figure 3A:
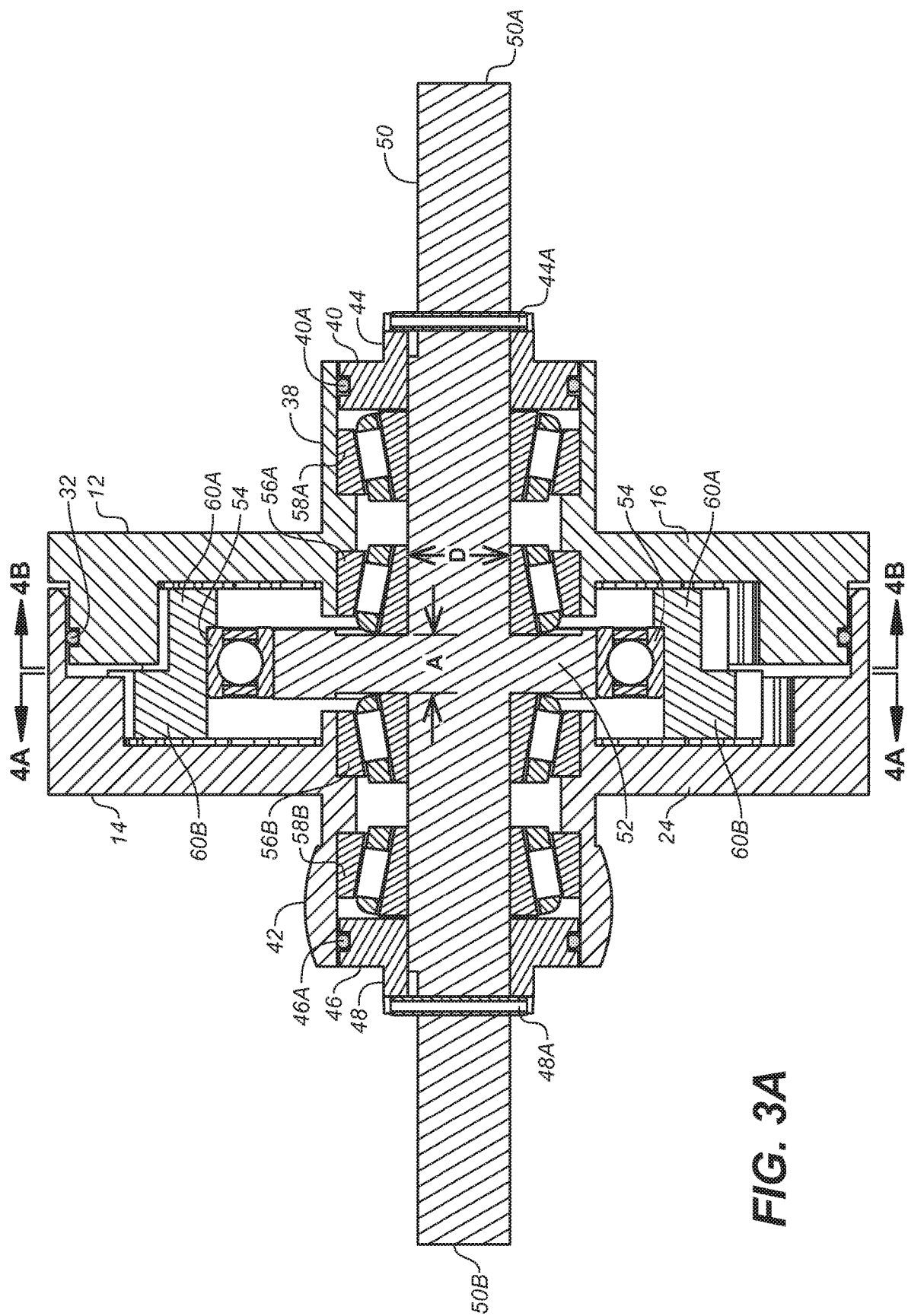
FIG. 3 illustrates an end view of the dual function gearbox with cross-sectional lines 3A-3A, with FIG. 3A illustrating a cross-section of the dual function gearbox as viewed in the direction indicated by the cross-sectional lines 3A-3A, and with FIG. 3B illustrating a perspective view of FIG. 3A.
Figure 3B:
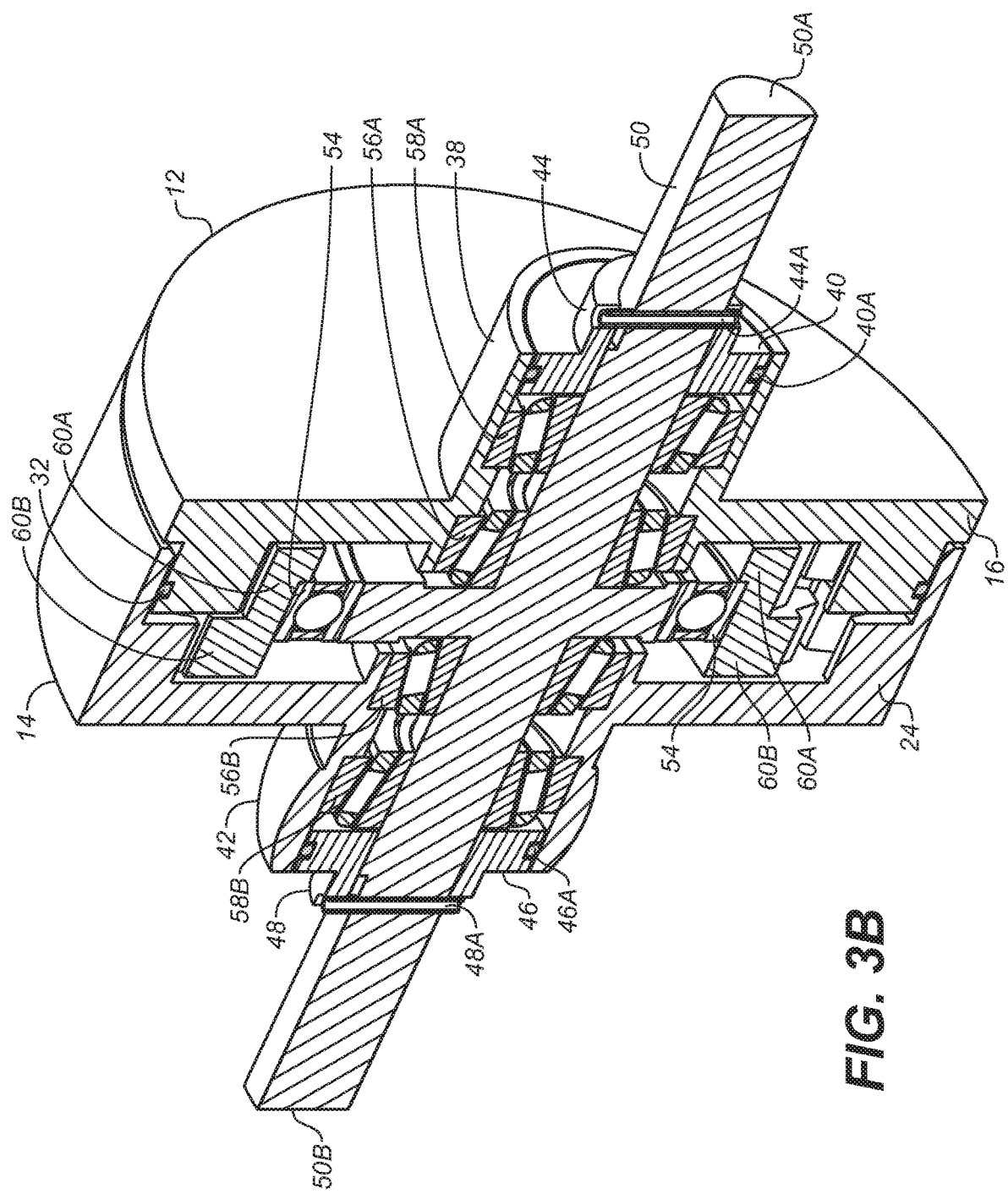

The drive shaft also comprises a single rotor 52 that is integral with and eccentrically disposed around a center portion of the drive shaft 50, with the single rotor 52 also disposed within the concentric opening 64 within the integral differential gear ring 60. The drive shaft 50 is supported, in part, within gearbox 10 by using several bearings. A rotor bearing 54, preferably a ball bearing, is journaled for rotation between the single rotor 52 and the integral differential gear ring 60. And, a drive shaft bearing 56A, preferably a roller bearing, is journaled for rotation between the drive shaft 50 and the input bearing housing enclosure 38, integral with the cylindrical opening 34 of input rotatable housing 12, and another drive shaft bearing 56B, preferably a roller bearing, is similarly journaled for rotation between the drive shaft 50, and output bearing housing enclosure 42, integral with cylindrical opening 36 of output rotatable housing 14, with drive shaft bearings, 56A and 56B, adjacent to opposite sides of the single rotor 52, respectively. Preferably, as best illustrated in FIG. 3A and FIG. 3B, drive shaft bearings 56A and 56B, comprising a first pair of drive shaft bearings, are the same size, and the axial distance A between the drive shaft bearings 56A and 56B on both sides of the single rotor 52 is less than the diameter D of the drive shaft 50. An additional drive shaft bearing 58A, preferably a roller bearing, is journaled for rotation between the drive shaft 50 and input bearing housing enclosure 38, and another drive shaft bearing 58B, preferably a roller bearing, is journaled for rotation between the drive shaft 50 and output bearing housing enclosure 42, with the drive shaft bearings, 58A and 58B, adjacent to rotatable securing rings 40 and 46, respectively. Preferably, drive shaft bearings 58A and 58B, comprising a second pair of drive shaft bearings, are the same size as the first pair of drive shaft bearings, with the second pair of drive shaft bearings positioned a predetermined axial distance from corresponding first pair of drive shaft bearings. In this regard, it is a novel feature of the dual function gearbox 10 that all of the drive shaft bearings, 56A, 56B, 58A and 58B, are journaled for rotation around the drive shaft 50, and the rotor bearing 54 is journaled for rotation around the single rotor 52, which is integral with the drive shaft 50. This bearing configuration should be distinguished from other gearbox designs that provide a relatively large bearing or bearing assembly journaled for rotation between peripheral portions of rotatable gearbox housings; rather than providing for much smaller bearings, as in the dual function gearbox 10, which are journaled around the drive shaft 50. A notable advantage of the bearing configuration of gearbox 10 is that by journaling the bearings around the drive shaft there is no need, as in other designs, for an additional large bearing that is provided in an attempt to stabilize the rotating housings. Additionally, the gearbox 10 can produce very high gear ratios with few components, and is therefore appropriate for systems that move slowly, such as solar trackers, and where cost is an important factor. For example when D1/D3 and D2/D4 pitch diameters are 38/36 and 40/38, respectively, the total velocity reduction is 1:361. The configuration of gearbox 10 further reduces complexity of assembly and cost of components. Cost of bearings increase rapidly with diameter, and any bearings located between housings, as is conventionally seen, are generally much larger and expensive. Further, as illustrated in FIG. 3A the short distance "A" between bearings, 56A and 56B, on opposite sides of the single rotor 52 of gearbox 10 results in very low bending loads on the shaft which allows for a smaller diameter of the shaft and bearings. That is another factor that results in a cost advantage of the design of gearbox 10. In applications that require large quantities of gearboxes, such as solar installations, there is a large multiplier effect on any measure of cost reduction.

Figure 1C:
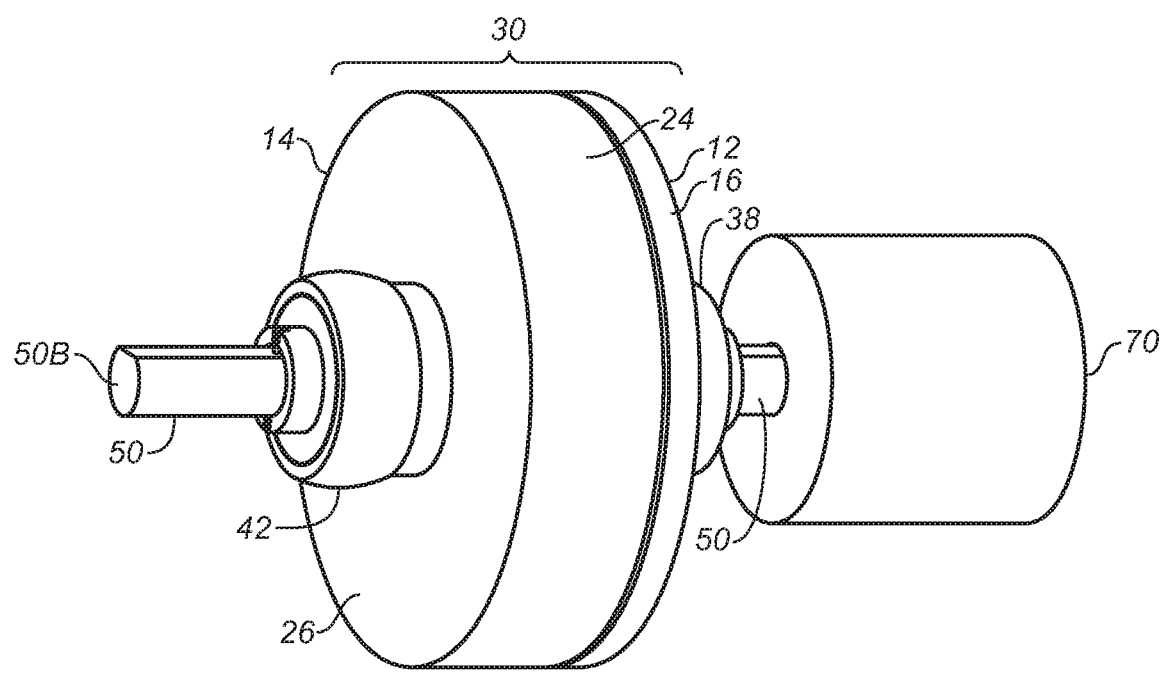
Figure 2A:
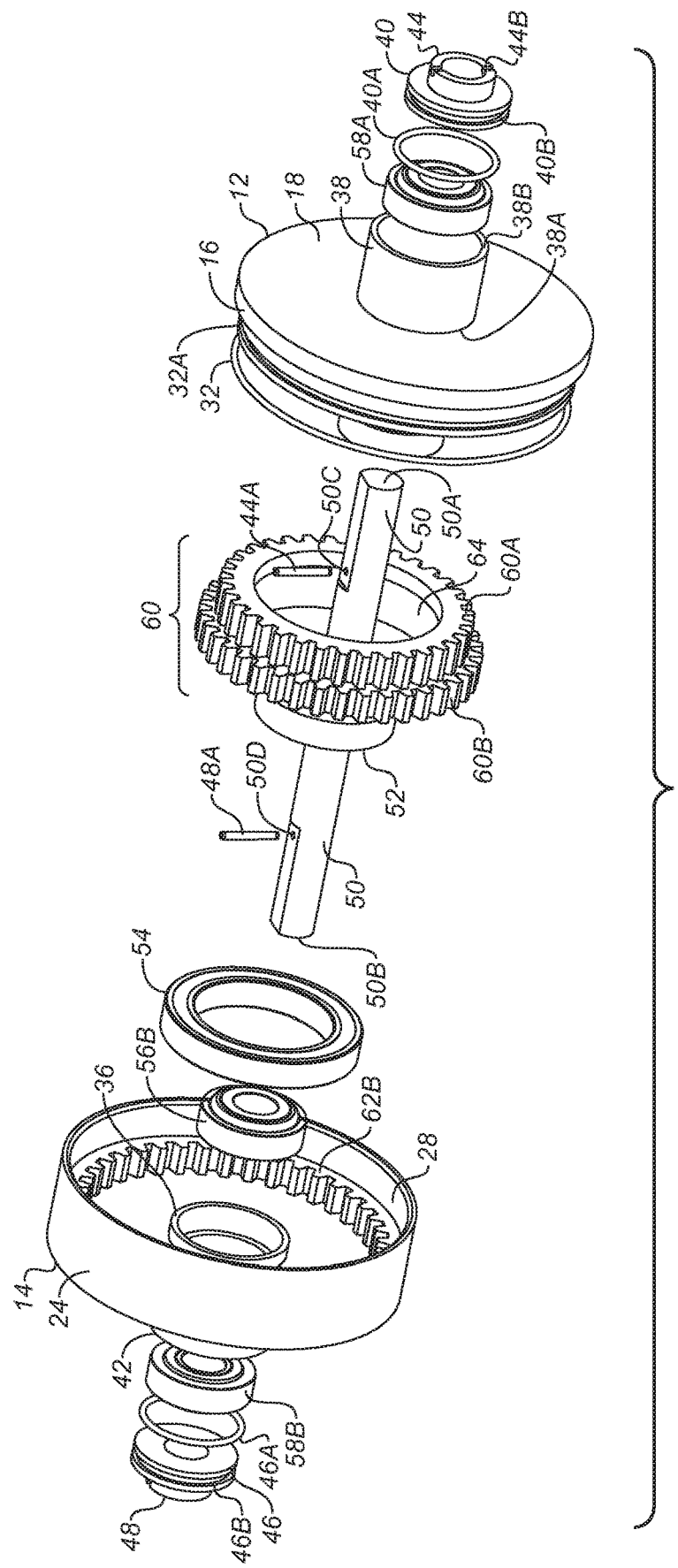
FIGS. 2A and 2B illustrate perspective exploded views of the dual function gearbox.
Figure 2B:
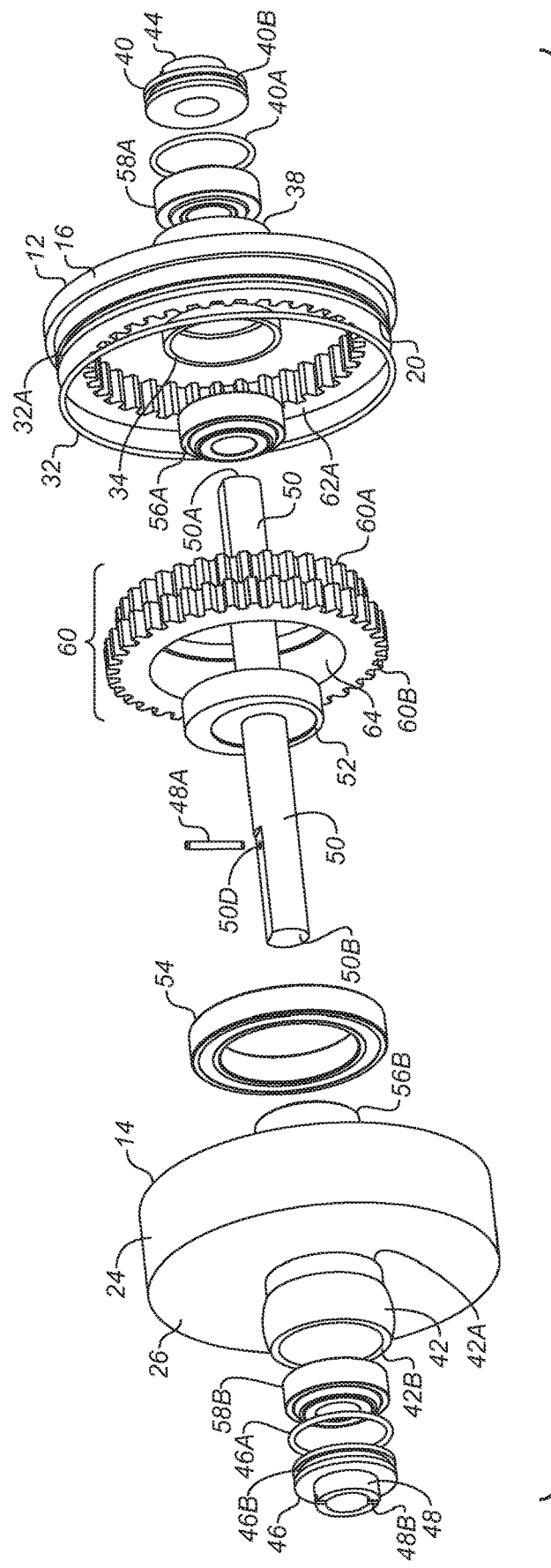

A driver 70, as shown in FIG. 1C, can be rotatably connected to the input connecting end 50A of the drive shaft 50, with the driver 70 for imparting rotational motion to the drive shaft 50, thereby causing the drive shaft 50 to rotate within the gearbox 10 by rotating within the gearbox housing enclosure 30, including integral input and output bearing housing enclosures, 38 and 42, and corresponding integral securing ring extensions, 44 and 48. The driver 70 can be, for example, any type of device or method, either automatic or manual, for supplying rotational energy, such as: an electric, gas, solar or other type of energy powered motor; a manually operated crank; or any combination of those devices.

With respect to the operation of the dual function gearbox 10, when the driver 70 is rotatably connected to the input connecting end 50A of drive shaft 50, the input rotatable housing 12 must be prevented from rotating by, for example, connecting the input rotatable housing 12 to a stationary structure, thereby converting the input rotatable housing 12, which can rotate, to an input rotatable housing 12, which is stationary and cannot rotate. In this manner the dual function gearbox 10 imparts a rotational motion to the output rotatable housing 14. More specifically, when rotational motion is imparted by the driver 70 to the input connecting end 50A of the drive shaft 50, the rotating drive shaft 50 imparts an eccentric rotation to the single rotor 52 around the rotating drive shaft 50; which in turn imparts an eccentric rotation to the first external gear ring 60A and to the second external gear ring 60B, with the first external gear ring 60A eccentrically rotating in engagement with the first internal gear 62A, which does not rotate since the first internal gear 62A is integral with the input rotatable housing 12 which is prevented from rotating, and with the second external gear ring 60B eccentrically rotating in engagement with the second internal gear 62B; and which in turn imparts a rotation to the second internal gear 62B and in turn imparts a rotation to the integral output rotatable housing 14 that rotates around the rotating drive shaft 50, with the rotating output rotatable housing 14 having an angular velocity that is less than the angular velocity of the rotating drive shaft, and with the rotating output rotatable housing 14 having a torque that is greater than the torque of the rotating drive shaft 50

It is a novel and useful feature of the dual function gearbox 10 that it functions to provide two separate output rotational motions that are generated by imparting an input rotational motion from the driver 70 to the input connecting end 50A of the drive shaft 50. Those motions are a rotational motion of the output rotatable housing 14 and a rotational motion of the output connecting end 50B of the drive shaft 50. The rotational motion of the output end 50B of drive shaft 50 is generated due to the structural features of the of the dual function gearbox 10 described above, which enable the drive shaft 50, disposed within the gearbox housing enclosure 30 of gearbox 10, to extend from the input connecting end 50A of drive shaft 50, positioned outside of the gearbox 10, to the output connecting end 50B of drive shaft 50, also positioned outside of the gearbox 10. In short, the drive shaft 50 extends all the way through the gearbox 10, with each connecting end, 50A and 50B, of the drive shaft 50 extending outside of the gearbox 10. As a result, when rotational motion is imparted from the driver 70 to the input connecting end 50A of the drive shaft 50, the drive shaft 50 also imparts rotational motion to the output connecting end 50B, which rotational motion can be utilized to provide the rotational motion to other devices.

Another novel and useful feature of the dual function gearbox 10 is that it can operate symmetrically in that driver 70 can be rotatably connected to either the input end 50A of drive shaft 50, as described above, or connected to the opposite output end 50B of drive shaft 50 and, with one exception, without in any manner altering the performance characteristics of the dual function gearbox 10 described above. Thus, when the driver 70 is connected to the output connecting end 50B of drive shaft 50, with the output rotatable housing 14 prevented from rotating, the input rotatable housing 12 can rotate, just like the output rotatable housing 14 can rotate when the driver 70 is rotatably connected to the input connecting end 50A of drive shaft 50. However, as noted above, all of the rotational characteristics of the rotational components are identical except that, when the input rotatable housing 12 is prevented from rotating, the output rotatable housing 14 rotates in an opposite direction from input rotatable housing 12 when it is prevented from rotating. But, this feature can have some unexpected benefits discussed below. In this regard, it should be understood that the reference to the "input" and "output" ends, 50A and 50B, of the drive shaft 50 and to all other similar designations, such as: input rotatable housing 12, output rotatable housing 14, input bearing housing enclosure 38, and output bearing housing enclosure 42, are merely arbitrary conventions that have been followed in order to accurately describe the dual function gearbox 10 and the manner of its operation.

Figure 5:
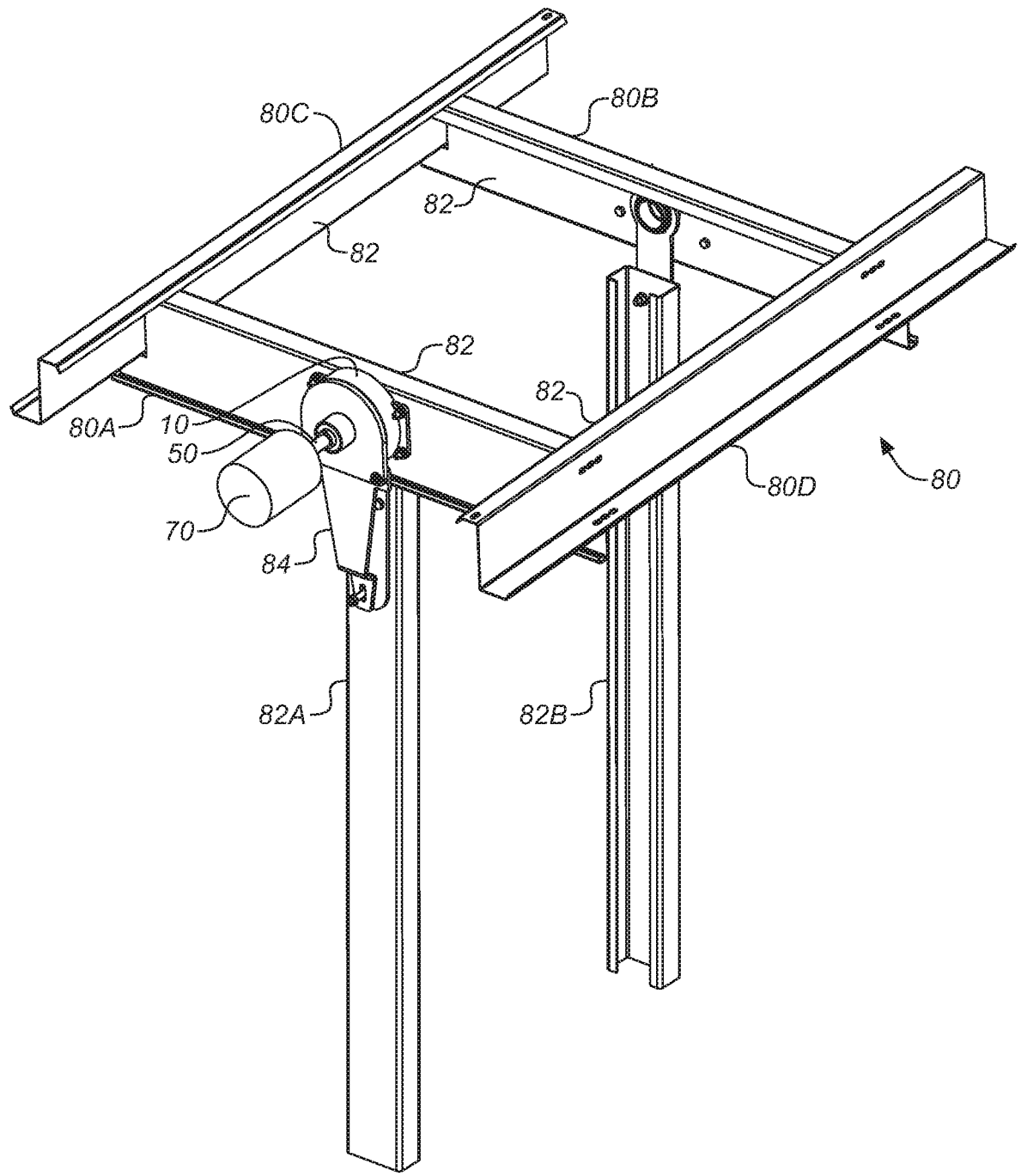
FIG. 5 illustrates the dual function gearbox integral with a solar panel frame.

Although there are many uses for the dual function gearbox 10, a preferred manner of utilizing the gearbox 10 can be to rotate a solar panel platform or table that supports an array of photo-voltaic solar panels. The rotating solar panel platform enables the array of photo-voltaic solar panels to follow the apparent path of the sun, thereby maximizing the amount of sunlight that is absorbed by the photo-voltaic solar panels. As illustrated in FIG. 5, the gearbox 10 can be rotatably connected to a solar panel frame 80. The solar panel frame 80 comprises parallel cross beams, 80A and 80B; parallel support beams, 80C and 80D, connected to corresponding parallel cross beams, 80A and 80B; and upright posts, 82A and 82B, rotatably connected at top ends to corresponding cross beams, 80A and 80B, and at bottom ends to the ground or a structure. The parallel cross beams, 80A and 80B, and the parallel support beams, 80C and 80D, form a support platform 82. The gearbox 10 can be attached to either cross beam 80A or cross beam 80B. However, as an example and as illustrated in FIG. 5, the gearbox 10 can be connected to cross beam 80A by connecting the output rotatable housing 14 of gearbox 10 to an outside surface of the cross beam 80A, with the input connecting end 50A of drive shaft 50 extending away from the support platform 82 and the output connecting end 50B of drive shaft 50 (not shown) extending through an opening within the cross beam 80A and into an open space within the support platform 82 formed by the parallel cross beans, 80A and 80B, and the parallel support beams, 80C and 80D. A flange 84 can connect the input rotatable housing 12 of gearbox 10 to the upright post 82A, thereby converting the input rotatable housing 12, which can rotate, to an input rotatable housing 12, which is stationary and cannot rotate. The driver 70 can be operatively connected to the input connecting end 50A of drive shaft 50. And, the support platform 82 supporting an array of photo-voltaic solar panels (not shown), can be connected to the support platform 82. As described above, when the driver 70 supplies rotational energy to the input connecting end 50A of drive shaft 50, the output rotatable housing 14 of the gearbox 10 will rotate around the drive shaft 10, and due to the connection of the output rotatable housing 14 to cross beam 80A, the support platform 82, will rotate around upright posts, 82A and 82B, at the same angular velocity as the output rotatable housing 14. In order for the angular velocity of the support platform 82 to effectively track the apparent path of the sun, a microcontroller in electronic connection with the driver 70 can be programmed to vary the angular velocity of the drive shaft 50 as needed, which in turn varies the angular velocity of the support platform 82. Although the rotational motion of the output connecting end 50B of the drive shaft 50 of the gearbox 10 is not utilized in this embodiment, the rotational motion of the output connecting end 50B of drive shaft 50 is readily available for use in conjunction with one or more additional gearboxes 10 as described in detail below.

Figure 6A:
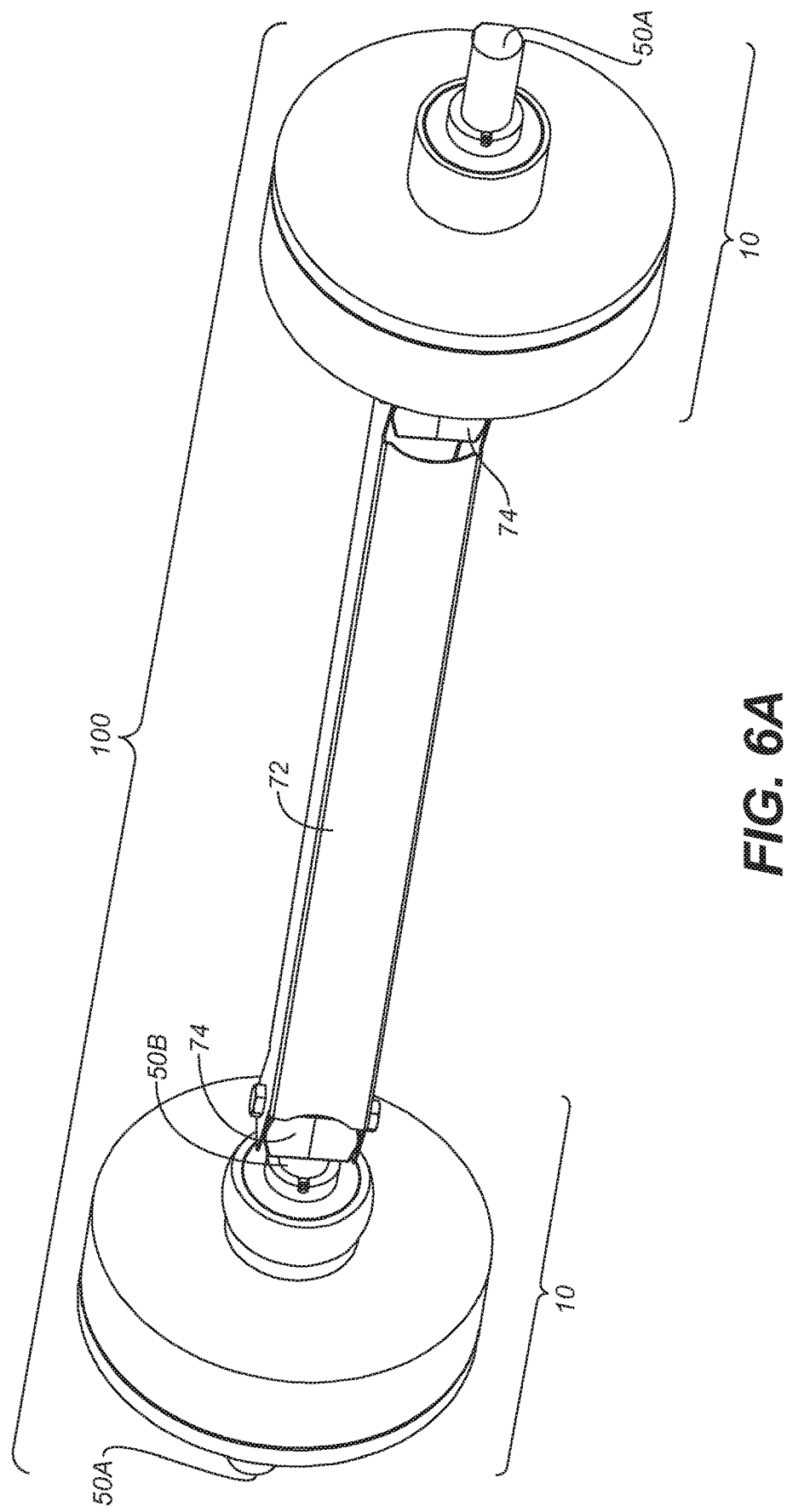
FIG. 6A illustrates a gearbox system with drive shafts of corresponding dual function gearboxes out of a pair of dual function gearboxes coaxially connected by an internal rotatable member.
Figure 6B:
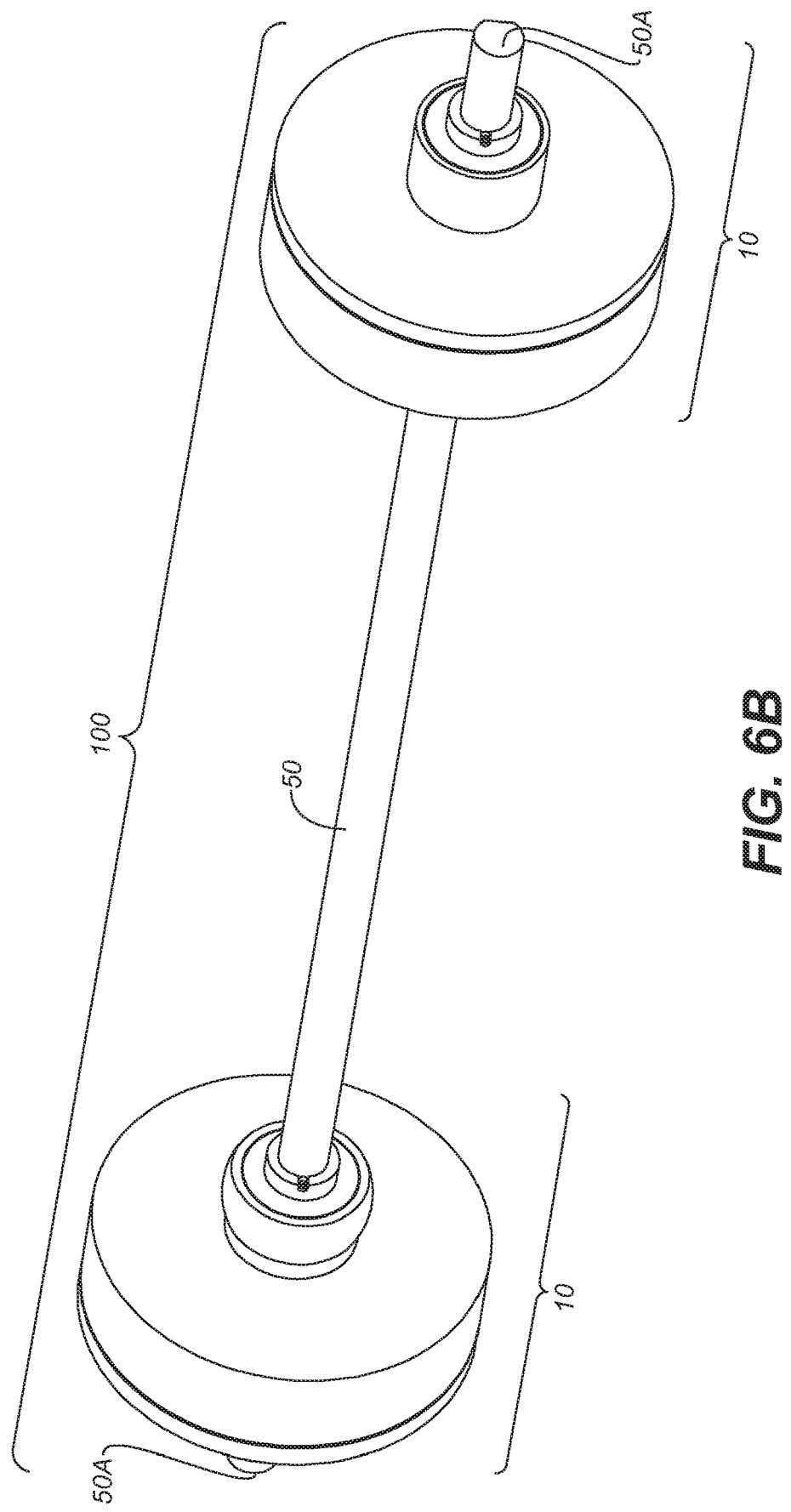
FIG. 6B shows that the drive shafts are replaced by a single drive shaft that extends through the pair of gearboxes. And, FIG. 6C is the same as FIG. 6B, with one of the gearboxes having a different orientation relative to the corresponding gearbox in FIG. 6B.
Figure 6C:
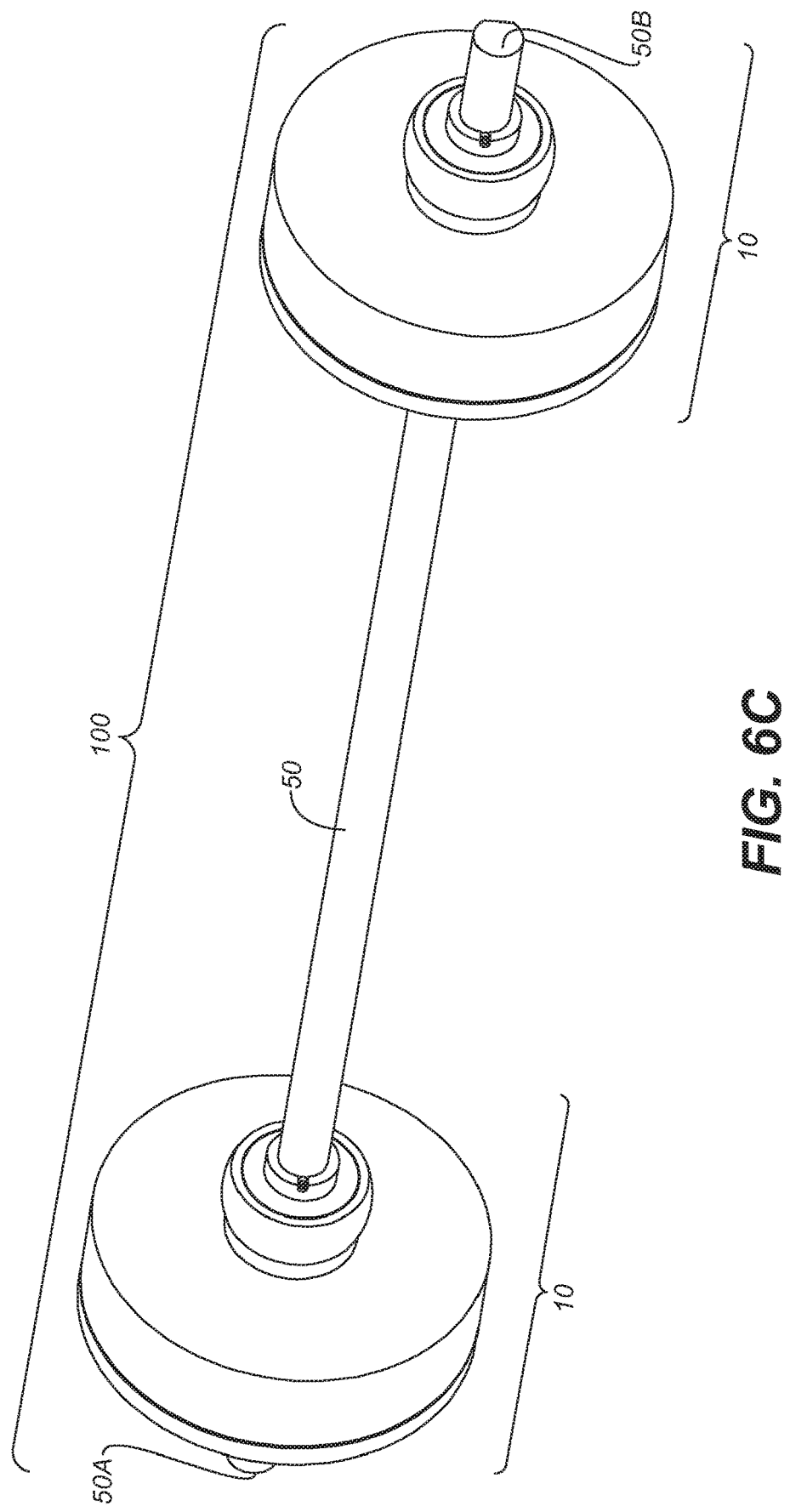

In another embodiment, the dual function gearbox 10, as described in connection with FIG. 1A through FIG. 4B, can be combined with another dual function gearbox 10, also as described in connection with the same figures, thereby forming a gearbox system 100 comprising a pair of gearboxes 10. As illustrated in FIG. 6A, the gearbox system 100 comprises a first pair of gearboxes 10, with a gearbox 10 out of the first pair of gearboxes 10 rotatably connected to the other gearbox 10 out of the first pair of gearboxes 10. More specifically, in a preferred embodiment, an output connecting end 50B of drive shaft 50 of a gearbox 10 out of the first pair of gearboxes 10 can be rotatably secured, preferably utilizing a universal joint 74, to an end of an internal rotatable member 72, and an output connecting end 50B of drive shaft 50 of the other gearbox 10 out of the first pair of gearboxes 10 can be rotatably secured, again using a universal joint 76, to the other end of the internal rotatable member 72, thereby rotatably connecting the drive shafts 50 of the pair of gearboxes 10. In a preferred embodiment, the internal elongate member 72 is in coaxial alignment with the drive shafts 50 corresponding to the first pair of gearboxes 10, and the internal rotatable member 72 is an elongate rod or tube. In another embodiment as illustrated in FIG. 6B, the drive shafts 50 of a corresponding pair of gearboxes 10 can be replaced with a single drive shaft 50 that extends through each gearbox out of the pair of gearboxes 10. And in another embodiment, a gearbox 10 out of the pair of gearboxes 10 illustrated in FIG. 6C can have an orientation that is opposite from the orientation of a corresponding gearbox 10 illustrated in FIG. 6B, in that said gearbox 10 out of the pair of gearboxes illustrated in FIG. 6C is rotated 180 degrees from the position of said corresponding gearbox 10 illustrated in FIG. 6B. In the preferred embodiment, the driver 70 can be rotatably connected to an input connecting end 50A of drive shaft 50 of either of the gearboxes 10 out of the first pair of gearboxes 10, with the driver 70 supplying rotational energy to the drive shaft 50, causing it to rotate within the gearbox 10, which in turn causes drive shaft 50 of the other gearbox 10 to rotate.

As to each gearbox 10 out of the first pair of gearboxes 10, the rotating drive shaft 50 imparts an eccentric rotation to the single rotor 52 around the rotating drive shaft 50; which in turn imparts an eccentric rotation to the first external gear ring 60A and to the second external gear ring 60B, with the first external gear ring 60A eccentrically rotating in engagement with the first internal gear 62A and with the second external gear ring 60B eccentrically rotating in engagement with the second internal gear 62B; and which in turn imparts a rotation to the second internal gear 62B and in turn a rotation to the output rotatable housing 14 as it rotates around the rotating drive shaft 50, with the rotating output rotatable housing 14 having an angular velocity that is less than the angular velocity of the rotating drive shaft, with the rotating output rotatable housing 14 having a torque that is greater than the torque of the rotating drive shaft 50.

Figure 7:
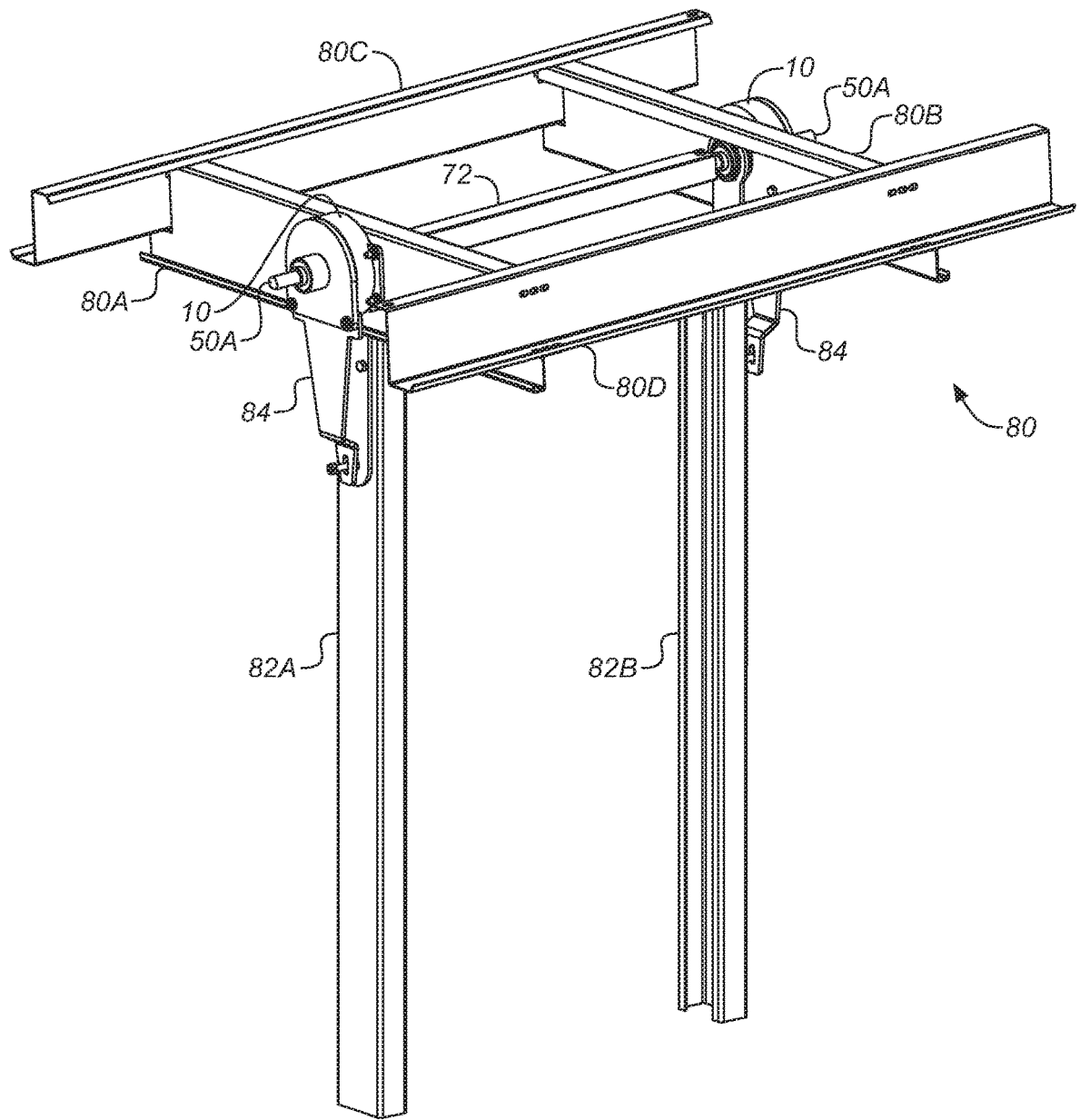
FIG. 7 illustrates the gearbox system with a pair of dual function gearboxes integral with a solar panel frame.

Preferably the first pair of gearboxes 10, as described above in connection with FIG. 6A through FIG. 6C, are utilized to rotate a support platform or table supporting an array of photo-voltaic solar panels. The rotating support platform enables the array of photo-voltaic solar panels to follow the apparent path of the sun, thereby maximizing the amount of sunlight light that is absorbed by the photo-voltaic solar panels. Specifically, as illustrated in FIG. 7, a gearbox 10 out of the first pair of gearboxes 10 can be rotatably connected to solar panel frame 80, having the same frame structure described above in connection with FIG. 5, in the same manner as described for the single gearbox 10 described in connection with FIG. 5. The other gearbox 10 out of the first pair of gearboxes 10 can be attached to the cross beam 80B by connecting the output rotatable housing 14 to an outside surface of the cross beam 80B, with the output connecting end 50B of drive shaft 50 extending through an opening within the cross beam 80B, and using a flange 84 to connect the input rotatable housing 12 to a corresponding upright post 82A or 82B. And, as described in more detail in connection with the preferred embodiment illustrated in FIG. 6A, an internal rotatable member 72 can be rotatably and coaxially secured at one end to the output connecting end 50B of drive shaft 50 of gearbox 10 out of the first pair of gearboxes 10, and the other end of the internal elongate member 72 can be rotatably and coaxially secured to output connecting end 50B of drive shaft 50 of the other gearbox 10 out of the first pair of gearboxes 10. Driver 70 can be rotatably connected to the input connecting end 50A of the drive shaft 50 of either of the gearboxes 10 in order to supply rotational energy to the drive shaft 50, causing it to rotate within the gearbox 10. The rotating drive shaft within each of the gearboxes 10 out of the first pair of gearboxes 10 gives rise to the same rotational motions within each gearbox 10 as described above in connection with FIG. 6A. And, an array of photo-voltaic solar panels can be attached to the support platform 82.

When driver 70 supplies rotational energy to the input connecting end 50A of drive shaft 50, the output rotatable housings 14 will rotate around corresponding drive shafts 50 that are integral with a corresponding pair of gearboxes 10, and due to the connection of the output rotatable housings 14 to corresponding rotatable cross beams, 80A and 80B, the support platform 82 will rotate at the same angular velocity as the output rotatable housings 14. In order for the angular velocity of the support platform 82 to effectively track the apparent path of the sun, a microcontroller in electronic connection with the driver 70 can be programmed to vary the angular velocity of the drive shaft 50 as needed, which in turn varies the angular velocity of the output rotatable housing 14 and in turn the rotational velocity of the solar panel frame 80.

In another embodiment of the gearbox system 100, the system is expanded by rotatably connecting two pairs of gearboxes 10. In this embodiment, as illustrated in FIG. 8, a second pair of gearboxes 10, having the same structure as the first pair of gearboxes 10 illustrated in the preferred embodiment of FIG. 6A, are connected to the first pair of gearboxes 10. Specifically, an input connecting end 50A of a drive shaft 50 of a gearbox 10 out of the second pair of gearboxes 10 is rotatably connected to an input connecting end 50A of a drive shaft 50 of a gearbox 10 out of the first pair of gearboxes 10. The rotatable connection between the first and second pairs of gearboxes 10 is provided by an external rotatable member 76 having a universal joint 74 on each end. The universal joint 74 on one end of the external rotatable member 76 can be rotatably connected to an input connecting end 50A of the drive shaft 50 of the first pair of gearboxes 10, with the universal joint 74 on the other end of the external rotatable member 76 rotatably connected to an input connecting end 50A of the drive shaft 50 of the second pair gearboxes 10. Preferably, the external rotatable member 76 can be an elongate rod or tube. As will be discussed in more detail in connection with FIG. 9, the first and second pairs of gearboxes 10 can be in non-coaxial alignment.

In operation, when driver 70 supplies rotational energy to the drive shafts 50 corresponding to the first pair of gearboxes 10, the elongate rotatable member 76 transmits that rotational energy to the drive shafts corresponding to the second pair of gearboxes 10. And, as to each gearbox 10 out of the first and second pair of gearboxes 10, the rotating drive shaft 50 imparts an eccentric rotation to the single rotor 52 around the rotating drive shaft 50; which in turn imparts an eccentric rotation to the first external gear ring 60A and to the second external gear ring 60B, with the first external gear ring 60A eccentrically rotating in engagement with the first internal gear 62A and with the second external gear ring 60B eccentrically rotating in engagement with the second internal gear 62B; and which in turn imparts a rotation to the output rotatable housing 14 as it rotates around the rotating drive shaft 50, with the rotating output rotatable housing 14 having an angular velocity that is less than the angular velocity of the rotating drive shaft, with the rotating output rotatable housing 14 having a torque that is larger than the torque of the rotating drive shaft 50.

Figure 9A:
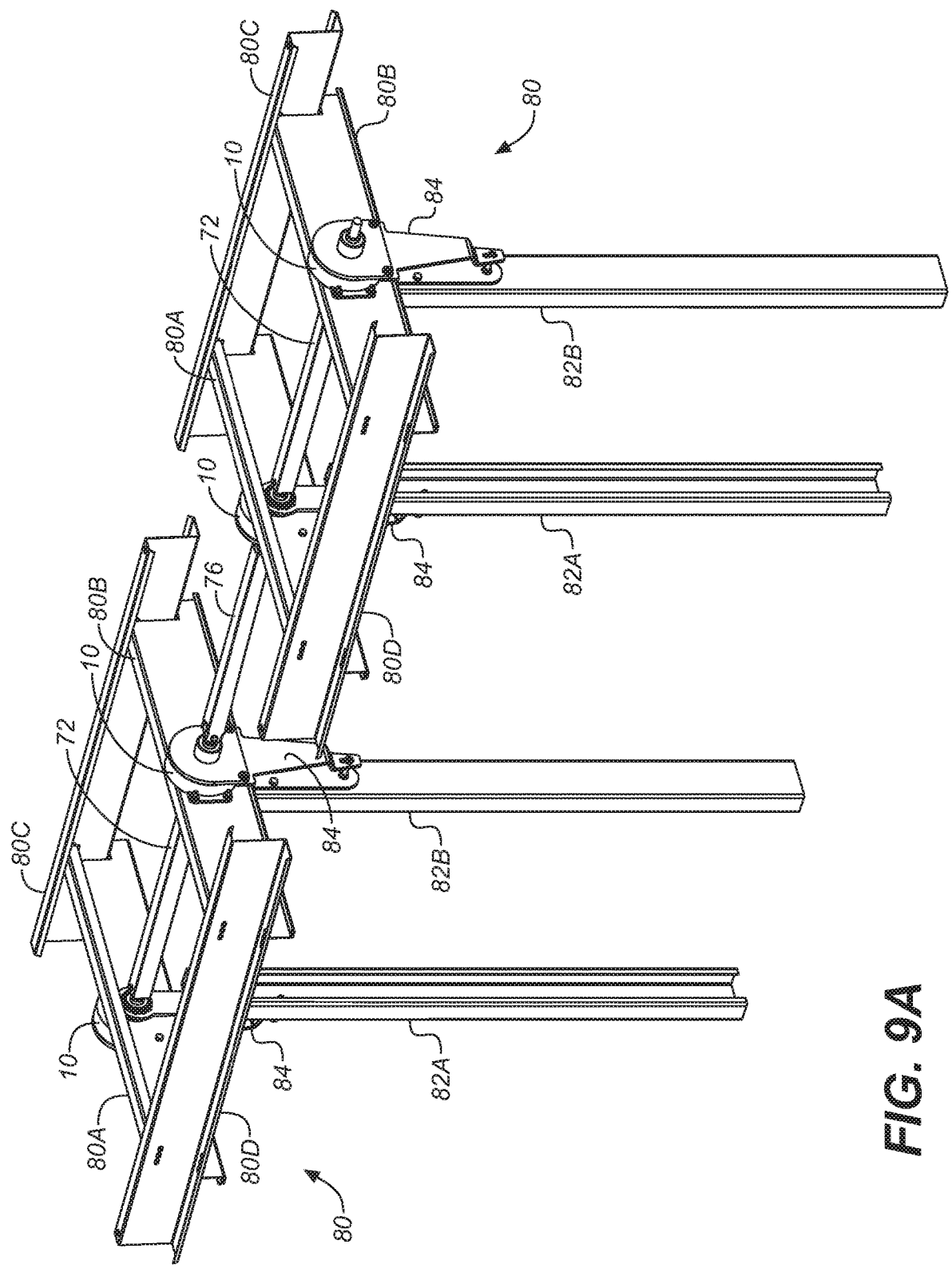
FIG. 9A and FIG. 9B illustrate the gearbox system with the two pairs of dual function gearboxes integral with two corresponding solar panel frames.
Figure 9B:
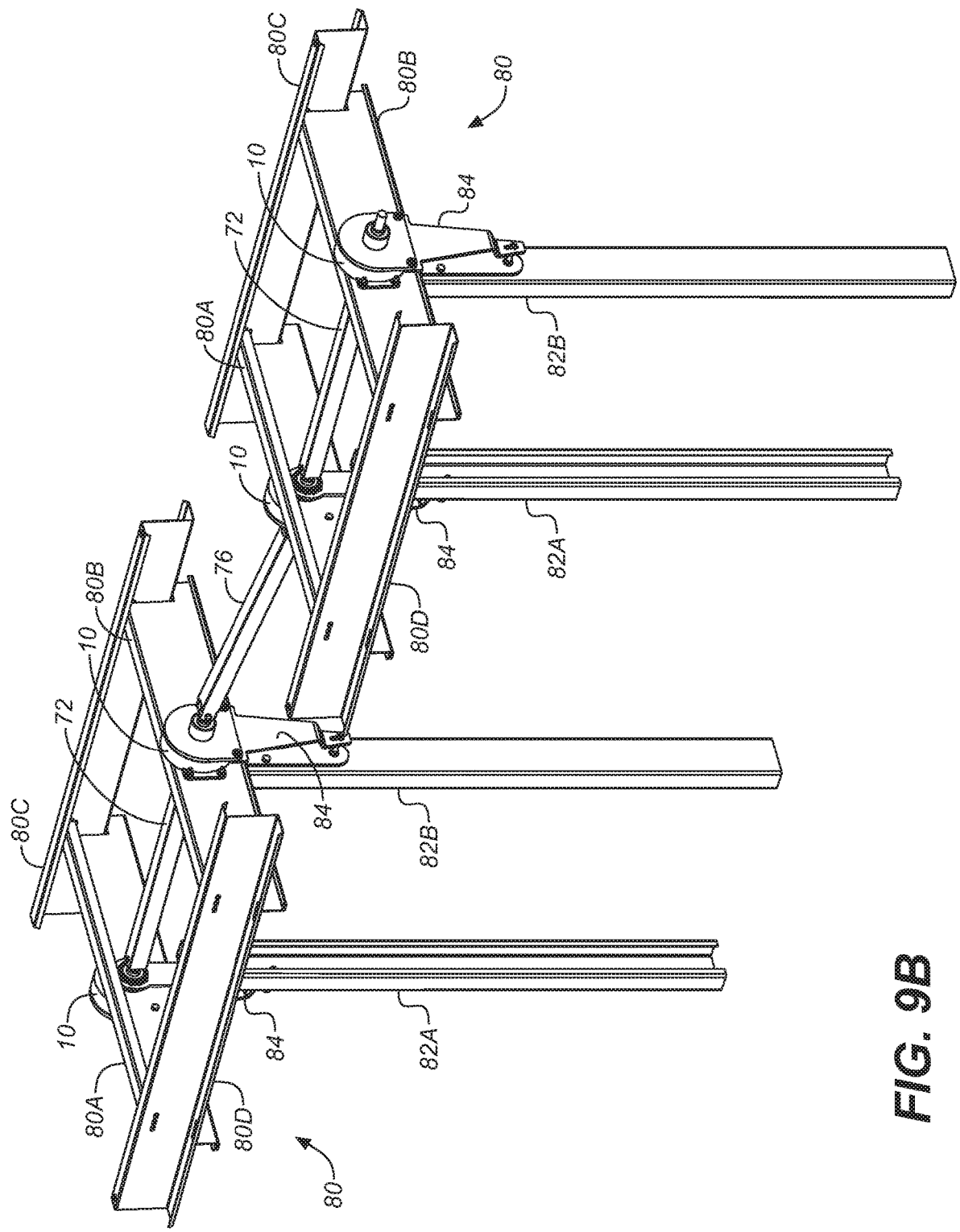

The second pair of gearboxes 10 out of the two pairs of gearboxes 10 can be connected to solar panel frame 80, as illustrated in FIG. 9A, in the same manner as the first pair of gearboxes 10, with the sole exception being that the driver 70 is in indirect rather than direct contact with the second pair of gearboxes 10. The indirect connection of the driver 70 to the second pair of gearboxes 10 is provided by the external rotatable member 76, described in connection with FIG. 8, which at one end is rotatably connected to the input connecting end 50A of drive shaft 50 of a gearbox 10 out of the first pair of gearbox pairs 10, and at the other end is rotatably connected to input connecting end 50A of drive shaft 50 of a gearbox 10 out of the second pair of gearboxes 10. Once connected to the first pair of gearboxes 10, the second pair of gearboxes 10 operates to rotate another support platform 82 in the same manner as the first pair of gearboxes 10 operates to rotate the support platform 82 described in connection with FIG. 7. FIG. 9B further illustrates that due to the universal joint connections integral with corresponding ends of the external rotatable member 76 that connects the first and second pairs of gearboxes 10, the external rotatable member 76 can be in non-coaxial alignment with the internal rotatable members 72 corresponding to the first and second pairs of gearboxes 10 and, thus, in an angled orientation relative to adjacent support platforms 82. In this manner the solar panel frames 80 can be secured to uneven ground or other surfaces, without impacting the operation of the two pairs of gearboxes 10 as described above in connection with FIG. 9A.

Figure 10:
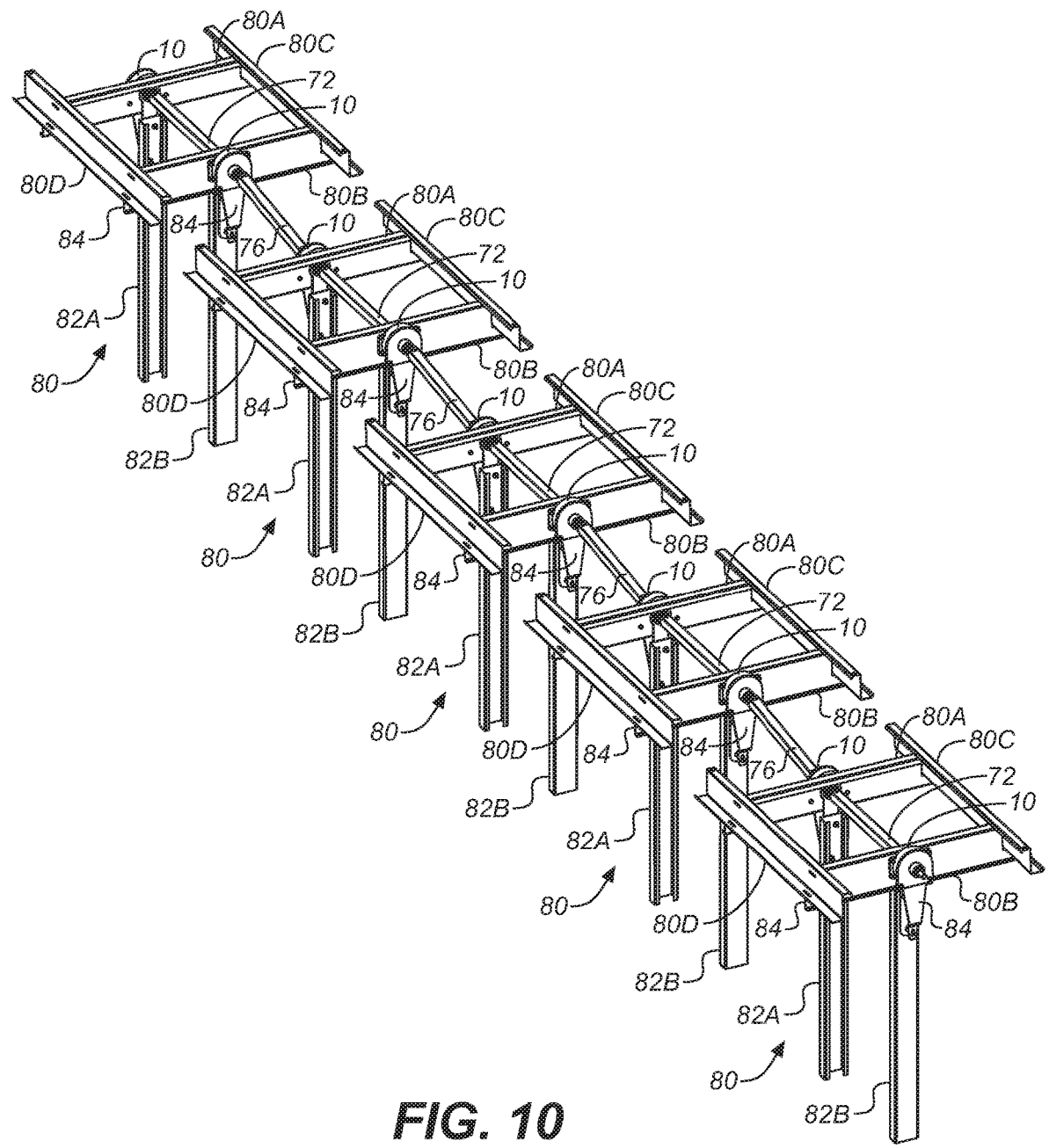
FIG. 10 illustrates a gearbox system with a plurality of dual function gearboxes integral with a plurality of corresponding solar panel frames.

The gearbox system 100 can be expanded further by rotatably connecting a plurality of pairs of gearboxes 10, with each pair of gearboxes out of the plurality of pairs of gearboxes adjacent to at least one other pair of gearboxes. An output connecting end 50B of a drive shaft 50 of a gearbox 10 out of said each pair of gearboxes 10 can be rotatably connected to an output connecting end 50B of a drive shaft 50 of the other gearbox 10 out of said each pair of gearboxes 10. And, as to adjacent pairs of gearboxes 10 out of the plurality of pairs of gearboxes 10 as specifically illustrated in FIG. 9A, an input connecting end 50B of a drive shaft 50 of a gearbox 10 out of a pair of gearboxes 10 can be rotatably connected to an input connecting end 50B of a drive shaft 50 of a gearbox out of an adjacent pair of gearboxes 10. And, as illustrated in FIG. 10, each pair of gearboxes 10 out the plurality of pairs of gearboxes 10 can be rotatably connected to a solar panel frame 80 as described above in connection with FIG. 7, with rotatable connections between adjacent pairs of gearboxes 10 out of the plurality of gearboxes 10 as described and illustrated in connection with FIG. 9A.

Another application of the dual function gearbox 10 is in connection with a greenhouse having a roof ridge, with a row of rectangular window panes forming an angled roof surface on both sides of the roof ridge. In this example, it would be beneficial to be able to rotate the rows of window panes on opposite sides of the roof ridge simultaneously around a common axis that is co-extensive with the roof ridge. The dual function gearbox 10 is particularly adapted to provide this functionality. As preliminary manner, the rows of window panes on opposite sides of the roof ridge would be rotatably connected so that each row could rotate from the bottom edge of the roof upwards around the roof ridge. Each rotatably connected window pane on opposite sides of the roof ridge would be connected to a pair of gearboxes 10 having a drive shaft extending through the gearboxes 10 as generally described and illustrated in connection with FIG. 6B, with the drive shaft 50 parallel and adjacent to the roof ridge and to the rotatable connection between the window panes. The input rotatable housing 12 of a gearbox 10 out of the pair of gearboxes 10 would be prevented from rotating by attaching the input rotatable housing 12 to a non-movable structural portion of the greenhouse, preferably to an internal rigid frame. And, the output rotatable housing 14 of gearbox 10 out of the pair of gearboxes 10 would be prevented from rotating by similarly attaching the output rotatable housing 12 to a non-movable structural portion of the greenhouse. When rotational energy is supplied to the drive shaft 50, the input rotatable housing 12 of the gearbox 10 that is not prevented from rotating will rotate around the rotating drive shaft. For present purposes, the rotation of the input rotatable housing 12 will be referred to as a "clock-wise" rotation. Simultaneously, the output rotatable housing 14 of the gearbox 10 that is not prevented from rotating will also rotate around the rotating drive shaft, in this case "counter-clockwise" as compared to the clockwise rotation of the input rotatable housing 12. In operation, the gearbox 10 out of the pair of gearboxes 10 that supplies clockwise rotation will similarly rotate a window pane upwards in a clockwise direction about the roof ridge. At the same time, the other gearbox 10 out of the pair of gearboxes 10 that supplies counter-clockwise rotation will rotate a window pane on the opposite side of the roof upwards in a counter-clockwise direction about the roof ridge.

Although a preferred embodiment and other embodiments have been described above, it will be recognized by those skilled in the art that other embodiments and features can be provided without departing from the underlying principles of those embodiments. The scope of the invention is defined by the appended claims.

The invention claimed is:
1. A gearbox, comprising:
a gearbox housing enclosure comprising:
    a first rotatable housing having a cylindrical sidewall, with the cylindrical sidewall having a closed end and an open end opposite from the closed end, and with a housing opening within the closed end of the first rotatable housing; and
    a second rotatable housing having a cylindrical sidewall: with the cylindrical sidewall having a closed end and an open en opposite from the closed end, with a housing; opening within the closed end of the second rotatable housing, and with the open end of the cylindrical sidewall of the second rotatable housing adjacent to the open end of the cylindrical sidewall of the first rotatable housing;
a first internal gear integral with the cylindrical sidewall of the first rotatable housing, with the first internal gear having a pitch diameter D1;
a second internal gear integral with the cylindrical sidewall of the second rotatable housing, with the second internal gear having a pitch diameter D2 that is larger or smaller than pitch diameter D1;
a first external gear ring and a second external gear ring that are concentrically connected so as to form an integral differential gear ring disposed within the gearbox housing enclosure, with the integral differential gear ring having a concentric opening within the integral differential gear ring, with the first external gear ring having a pitch diameter D3 that is less than the pitch diameter D1 of the first internal gear, and with the second external gear ring having a pitch diameter D4 that is less than the pitch diameter D2 of the second internal gear, with the first external gear ring in partial engagement with the first internal gear and with the second external gear ring in partial engagement with the second internal gear; and
a drive shaft disposed within the gearbox housing enclosure, with the drive shaft having an integral single rotor eccentrically disposed around the drive shaft, with a first connecting end, integral with the drive shaft, disposed through the housing opening within the first rotatable housing and extending outside of the gearbox housing enclosure, with a second connecting end, integral with the drive shaft, disposed through the housing opening within the second rotatable housing and extending outside of the gearbox housing enclosure, and with the integral single rotor disposed within the opening within the integral differential gear ring; and whereby rotational energy imparts a rotational motion to the drive shaft, which in turn imparts an eccentric rotation to the integral single rotor around the rotating drive shaft, which in turn imparts an eccentric rotation to the first external gear and to the second external gear, with the first external gear eccentrically rotating in engagement with the first internal gear and with the second external gear eccentrically rotating in engagement with the second internal gear, and which in turn imparts a rotation to one of the rotatable housings which rotates around the rotating drive shaft, and with said rotating rotatable housing having an angular velocity that is less than the angular velocity of the drive shaft and having a torque that is greater than the torque of the drive shaft.

2. The gearbox as in claim 1 further comprising a first pair of drive shaft bearings disposed around the drive shaft, with the drive shaft bearings out of the first pair of drive shaft bearings positioned on opposite sides of and adjacent to the single rotor, and with the drive shaft bearings out of the first pair of drive shaft bearings having the same size.

3. The gearbox as in claim 2 in which the drive shaft bearings out of the first pair of drive shaft bearings are separated by an axial distance A that is less than the diameter D of the drive shaft.

4. The gearbox as in claim 1 further comprising a second pair of drive shaft bearings disposed around the drive shaft, with the second pair of drive shaft bearings positioned a predetermined axial distance from corresponding first pair of drive shaft bearings; and with each of drive shaft bearings out of the second pair of drive shaft bearings having the same size as each of the drive shaft bearings out of the first pair of drive shaft bearings.

5. The gearbox as in claim 1 in which the first rotatable housing is adapted to convert the first rotatable housing to a stationary first rotatable housing that cannot rotate around the drive shaft.

6. The gearbox as in claim 1 in which the second rotatable housing is adapted to convert the second rotatable housing to a stationary second rotatable housing that cannot rotate around the drive shaft.

7. The gearbox as in claim 1 also comprising a driver in rotatable connection to the first connecting end of the drive shaft.

8. The gearbox as in claim 1 also comprising, a driver in rotatable connection to the second connecting end of the drive shaft.

9. The gearbox as in claim 1 in which the integral differential gear ring has spur gears with the teeth having an involute profile and a pressure angle of lower than about 25 degrees.

10. The gearbox as in claim 1 in which the open end of the cylindrical sidewall of the first rotatable housing is concentrically disposed within the open end of the cylindrical sidewall of the second rotatable housing such that cylindrical sidewall of the second rotatable housing partially overlaps the cylindrical sidewall of the first rotatable housing, thereby creating, partially overlapping cylindrical sidewalls.

11. The gearbox as in claim 10 in which an O-ring is disposed between the partially overlapping sidewalls.

12. A gearbox system, comprising:
a first pair of gearboxes, with each gearbox out of the first pair of gearboxes, comprising:
a gearbox housing enclosure comprising,
a first rotatable housing having a cylindrical sidewall, with the cylindrical sidewall having a closed end and an open end opposite from the closed end, and with a housing opening within the closed end of the first rotatable housing; and
a second rotatable housing having a cylindrical sidewall, with the cylindrical sidewall having a closed end and an open end opposite from the closed end, with a housing opening within the closed end of the second rotatable housing, and with the open end of the cylindrical sidewall of the second rotatable housing adjacent to the open end of the cylindrical sidewall of the first rotatable housing,
a first internal gear integral with the cylindrical sidewall of the first rotatable housing, with the first internal gear having a pitch diameter D1;
a second internal gear integral with the cylindrical sidewall of the second rotatable housing, with the second internal gear having a pitch diameter D2 that is larger or smaller than pitch diameter D1;
a first external gear ring and a second external gear ring that, are concentrically connected so as to form an integral differential gear ring disposed within the gearbox housing enclosure, with integral differential gear ring having a concentric opening within the integral differential gear ring, with the first external gear ring having a pitch diameter D3 that is less than the pitch diameter D1 of the first internal gear and with the second external gear ring having a pitch diameter D4 that is less than the pitch diameter D2 of the second internal gear, with the first external gear ring in partial engagement with the first internal gear and with the second external gear ring in partial engagement with the second internal gear; and
a drive shaft disposed within the gearbox housing enclosure, with the drive shaft having an integral single rotor eccentrically disposed around the drive shaft, with a first connecting end, integral with the drive shaft, disposed through the housing opening within the first rotatable housing, with a second connecting end, integral with the drive shaft, disposed through the housing opening within the second rotatable housing, and with the integral single rotor disposed within the opening within the integral differential gear ring; and an internal rotatable member in rotatable connection to a connecting end of a drive shaft of a gearbox out of the first pair of gearboxes, and with the internal rotatable member also in rotatable connection to a connecting end of a drive shaft of the other gearbox out of the first pair of gearboxes; and whereby, as to each gearbox out of the first pair of gearboxes, rotational energy imparts a rotational motion to the drive shaft, which in turn imparts an eccentric rotation to the integral single rotor around the rotating drive shaft, which in turn imparts an eccentric rotation to the first external gear and to the second external gear, with the first external gear eccentrically rotating in engagement with the first internal gear and with the second external gear eccentrically rotating in engagement with the second internal gear, and which in turn imparts a rotation to one of the rotatable housings which rotates around the rotating drive shaft, and with the rotating rotatable housing having an angular velocity that is less than the angular velocity of the drive shaft and having a torque that is greater than the torque of the drive shaft.

13. The first pair of gearboxes as in claim 12 in which the first rotatable housing of each gearbox is adapted to convert the first rotatable housing to a stationary first rotatable housing that cannot rotate around the drive shaft.

14. The first pair of gearboxes as in claim 12 in which the second rotatable housing of each gearbox is adapted to convert the second rotatable housing to a stationary second rotatable housing that cannot rotate around the drive shaft.

15. The first pair of gearboxes as in claim 12 in which the first connecting end of the drive shaft of each gearbox extends outside of the gearbox.

16. The first pair of gearboxes as in claim 12 in which the second connecting end of the drive shaft of each gearbox extends outside of the gearbox.

17. The first pair of gearboxes as in claim 12 comprising driver in rotatable connection to the first connecting end of a drive shaft of a gearbox out of the first pair of gearboxes.

18. The first pair of gearboxes as in claim 12 comprising a driver in rotatable connection to the second connecting end of the drive shaft of a gearbox out of the first pair of gearboxes.

19. The first pair of gearboxes as in claim 12 in which the internal rotatable member is in axial alignment with the drive shafts of corresponding gearboxes out of the first pair of gearboxes.

20. The first pair of gearboxes as in claim 12 in which the internal rotatable member is an elongate rod or tube.

21. The first pair of gearboxes as in claim 12 in which the drive shafts of corresponding gearboxes out of the first pair of gearboxes are replaced with a single drive shaft that is disposed within the gearbox housing enclosure of each gearbox out of the first pair of gearboxes.

22. The first pair of gearboxes as in claim 21 in which a gearbox out of the first pair of gearboxes has an orientation that is opposite from the orientation of the other gearbox out of the first pair of gearboxes.

23. The first pair of gearboxes as in claim 12 in which the integral differential gear ring for each gearbox has spur gears with the teeth having an involute profile and a pressure angle of lower than about 25 degrees.

24. The pair of gearboxes as in claim 12 in which the open ends of the cylindrical sidewalls of corresponding first rotatable housings is concentrically disposed within open ends of the cylindrical sidewalls of corresponding second rotatable housings such that the cylindrical sidewalls of the corresponding second rotatable housings partially overlap the cylindrical sidewalls of the corresponding first rotatable housings, thereby creating partially overlapping cylindrical sidewalk for each gearbox out the pair of gearboxes.

25. The pair of gearboxes as in claim 24 in which an O-ring for each gearbox is disposed between the partially overlapping sidewalls.

26. The gearbox system as in claim 12 further comprising a second pair of gearboxes, with each gearbox out of the second pair of gearboxes having the structure of each gearbox out of the first pair of gearboxes, with a first connecting end of a drive shaft of a gearbox out of the second pair of gearboxes rotatably connected to a first connecting end of a drive shaft of a gearbox Out of the first pair of gearboxes, thereby connecting the first and second pairs of gearboxes.

27. The gearbox system as in claim 26 comprising an external rotatable member rotatably connecting the drive shafts corresponding to the first and second pairs of gearboxes.

28. The gearbox system as in claim 27 comprising a pair of universal joints that that rotatably connect corresponding ends of the external rotatable member to corresponding first and second pairs of gearboxes.

29. The gearbox system as in claim 27 in which the external rotatable member is an elongate rod or tube.

30. A gearing method, comprising
  rotatably and coaxially connecting a drive shaft of a gearbox out of a pair of gearboxes to a drive shaft of the other gearbox out of the pair of gearboxes;
  rotating the coaxially connected drive shafts,
  eccentrically rotating rotors integral with corresponding rotating drive shafts;
  engaging the eccentrically rotating rotors with corresponding first external gears and second external gears for corresponding gearboxes out of the pair of gearboxes, causing the first and second external gears to rotate eccentrically;
  engaging the eccentrically rotating first external gears and second external gears for corresponding gearboxes out of the pair of gearboxes with the first internal gears and the second internal gears for corresponding gearboxes out of the pair of gearboxes; and
  preventing the first internal gears for corresponding gearboxes out of the pair of gearboxes from rotating, thereby causing the second internal gears for corresponding gearboxes out of the pair of gearboxes to rotate around corresponding rotating drive shafts.

* * * * *